US007511214B2

(12) United States Patent
Ikeya et al.

(10) Patent No.: US 7,511,214 B2
(45) Date of Patent: Mar. 31, 2009

(54) AUTOMATIC PERFORMANCE APPARATUS FOR REPRODUCING MUSIC PIECE

(75) Inventors: Tadahiko Ikeya, Hamamatsu (JP); Nobuhiro Nambu, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 62 days.

(21) Appl. No.: 11/196,214

(22) Filed: Aug. 2, 2005

(65) Prior Publication Data

US 2006/0031063 A1 Feb. 9, 2006

(30) Foreign Application Priority Data

Aug. 4, 2004 (JP) ............................ 2004-227503

(51) Int. Cl.
*G10H 1/22* (2006.01)
*G06F 17/00* (2006.01)

(52) U.S. Cl. .......................................... 84/618; 700/94

(58) Field of Classification Search .................. 84/603, 84/607, 609, 615, 622, 618; 700/94
See application file for complete search history.

(56) References Cited

U.S. PATENT DOCUMENTS 5,633,993 A * 5/1997 Redmann et al. ............ 345/419
5,804,754 A * 9/1998 Iwase et al. ................... 84/617
6,599,195 B1 * 7/2003 Araki et al. ................... 463/43
2003/0015084 A1 * 1/2003 Bengtson ..................... 84/622

FOREIGN PATENT DOCUMENTS

| | | |
|---|---|---|
| JP | 59-113490 | 6/1984 |
| JP | 4283797 | 10/1992 |
| JP | 8-115084 | 5/1996 |
| JP | 11259074 | 9/1999 |

* cited by examiner

*Primary Examiner*—Walter Benson
*Assistant Examiner*—Andrew R Millikin
(74) *Attorney, Agent, or Firm*—Morrison & Foerster LLP

(57) ABSTRACT

A CPU 21 sequentially changes over plural music pieces and reproduces the same by a program processing. Upon the changeover of the music piece, the volume of the tone signal that is being generated at each tone generating channel in a tone generating circuit 14 is gradually decreased, whereby the tone signal is finally faded out. The volume decreasing speed in this case is such that the higher the priority order of the performance data is, the slower the speed is. The generation of a tone signal based upon performance data of next music piece data is assigned one after another from a tone generating channel wherein a fade-out has been completed. The volume of the assigned tone signal is controlled so as to gradually increased, whereby the tone signal is faded in. In this case, the assignment of the generation of the tone signal based upon the performance data of the next music piece is made earlier, as the order of priority of the performance data is higher. A first music piece and second music piece can be naturally changed over and reproduced as cross-faded without preparing plural tone generating circuit systems.

9 Claims, 13 Drawing Sheets

FIG.7
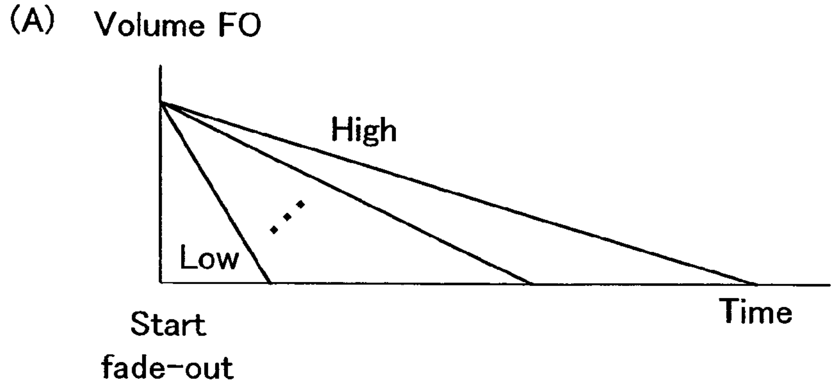
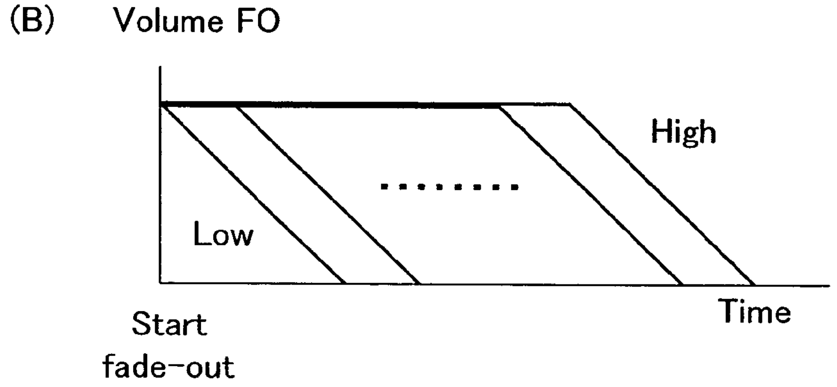
FIG.8
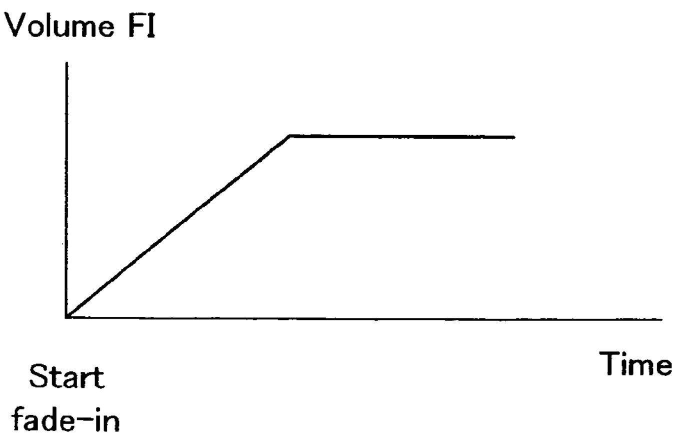

FIG.9

(A) First channel assignment table

| Channel number of MIDI message | Channel number in tone generating circuit |
|---|---|
| 1 | 1 |
| 2 | 2 |
| · · | · · |
| 15 | 15 |
| 16 | 16 |

⇨

| Channel number of MIDI message | Channel number in tone generating circuit |
|---|---|
| 1 | 1 |
| 2 | 0 |
| · · | · · |
| 15 | 15 |
| 16 | 16 |

⇨

| Channel number of MIDI message | Channel number in tone generating circuit |
|---|---|
| 1 | 0 |
| 2 | 0 |
| · · | · · |
| 15 | 0 |
| 16 | 0 |

(B) Second channel assignment table

| Channel number of MIDI message | Channel number in tone generating circuit |
|---|---|
| 1 | 0 |
| 2 | 0 |
| · · | · · |
| | |
| 16 | 0 |

⇨

| Channel number of MIDI message | Channel number in tone generating circuit |
|---|---|
| 1 | 0 |
| 2 | 0 |
| · · | · · |
| 15 | 2 |
| 16 | 0 |

⇨

| Channel number of MIDI message | Channel number in tone generating circuit |
|---|---|
| 1 | 13 |
| 2 | 15 |
| · · | · · |
| 15 | 2 |
| 16 | 7 |

AUTOMATIC PERFORMANCE APPARATUS FOR REPRODUCING MUSIC PIECE

BACKGROUND OF THE INVENTION

1. Field of the Invention

The present invention relates to an automatic performance apparatus that supplies performance data indicating a music piece to a tone generating circuit with the progression of the music piece for reproducing the music piece, and to a computer program and a method applied to this apparatus.

2. Description of the Related Art

Heretofore, it has been known that performance data corresponding to each of plural music pieces is sequentially supplied to a tone generating circuit to continuously reproduce plural music pieces. In an apparatus disclosed in Japanese Unexamined Patent Application No. SHO59-113490, performance data corresponding to a first music piece, of the continuous first and second music pieces, is supplied to a first tone generating circuit to reproduce the first music piece, and a tone signal generated at the end section of the first music piece is faded out. Then, performance data corresponding to the second music piece is started to be supplied to a second tone generating circuit from the start of the fade-out to reproduce the second music piece, and a tone signal generated at the beginning section of the second music piece is faded in, whereby the first and second tone signals are cross-faded to perform a continuous reproduction. Further, Japanese Patent No. 3464290 discloses that MIDI data composing the performance data of the first and second music pieces is sequentially supplied to a tone generating circuit, wherein the first and second music pieces are reproduced as cross-faded when the first and second music pieces are changed over.

However, the former conventional technique entails a problem that two tone generating circuit systems, each being independent, are required in order to reproduce the first and second music pieces as cross-faded. Further, the latter conventional technique only discloses that the MIDI data relating to the first and second music pieces is outputted to the tone generating circuit and cross-faded. Therefore, in case where the MIDI data relating to the first and second music pieces designates the same tone generating channel, only the tone signal corresponding to the MIDI data relating to the first or second music piece that is read out earlier is generated, thereby entailing a problem that the cross fade upon the changeover of the reproduction of the first and second music pieces is unnatural or impossible.

SUMMARY OF THE INVENTION

The present invention is accomplished in view of the above-mentioned problems, and aims to provide an automatic performance apparatus wherein first and second music pieces can be naturally changed and reproduced as cross-faded without preparing plural tone generating circuit systems, and a computer program applied to this apparatus.

In order to attain the aforesaid object, the feature of the present invention is that an automatic performance apparatus that supplies performance data indicating a music piece to a tone generating circuit having plural tone generating channels each generating a tone signal, to thereby reproduce the music piece, is provided with a performance data memory that stores plural pieces of performance data corresponding to each of the plural music pieces and including channel information for designating any one of the plural tone generating channels; a performance data read-out portion that reads out the performance data of the first and the second music piece among plural pieces of performance data of the music piece stored in the performance data memory with the progression of the music piece; a fade-out processing portion that processes the read-out performance data of the first music piece such that the tone signal generated by the performance data is faded out and outputs the resultant to the tone generating circuit; a fade-in processing portion that processes the read-out performance data of the second music piece such that the tone signal generated by the performance data is faded in and outputs the resultant to the tone generating circuit; and an assignment controller that assigns the generation of the tone signal based upon the performance data of the second music piece to a tone generating channel that is not used for generating the tone signal based upon the performance data of the first music piece, the assigned tone generating channel being different from a tone generating channel designated by the channel information included in the performance data of the second music piece. In this case, the performance data read-out portion independently reads out the performance data of the first and second music pieces with a tempo of the first and second music pieces.

Further, the assignment controller changes, for example, the channel information included in the performance data of the second music piece such that the generation of the tone signal based upon the performance data of the second music piece is assigned to the tone generating channel that is not used for the generation of the tone signal based upon the performance data of the first music piece. In this case, the fade-out processing portion processes the performance data such that the fade-out speed of the tone signal is made different for every tone generating channel in accordance with a predetermined order of priority. The tone generating channel wherein the fade-out is ended may be regarded as a tone generating channel that is not used for the generation of the tone signal based upon the performance data of the first music piece.

Instead of this, in order to realize a cross-fade, a method for forming a tone generating channel that is not utilized for the generation of the tone signal based upon the performance data of the first music piece includes that the number of tone generating channels designated by the channel information in the performance data is made less than the number of tone generating channels in the tone generating circuit, and a part of the tone generating channels is not designated by the channel information included in the performance data of the first and second music pieces. In this case, the generation of the tone signal based upon the performance data of the first music piece is assigned to the tone generating channel designated by the channel information included in the performance data of the first music piece. On the other hand, the channel information included in the performance data of the second music piece is changed so as to indicate the aforesaid part of the undesignated tone generating channel, and the generation of the tone signal based upon the performance data of the second music piece is assigned to the tone generating channel designated by the changed tone generating channel.

In the feature of the present invention having the aforesaid configuration, the generation of the tone signal based upon the performance data of the second music piece is assigned, by the assignment controller, to the tone generating channel that is not utilized for the generation of the tone signal based upon the performance data of the first music piece. Specifically, the generation of the tone signal based upon the performance data of the first music piece takes the first priority to be assigned to the tone generating channel, while the generation of the tone signal based upon the performance data of the second music piece is assigned to the tone generating channel that is not utilized for the generation of the tone signal based upon the performance data of the first music piece. Accordingly, only by using a single tone generating circuit, the continuous reproduction from the first music piece to the second music piece can be naturally performed as cross-faded.

Moreover, in case where the fade-out processing portion processes the performance data such that the fade-out speed of the tone signal is made different for every tone generating channel in accordance with a predetermined order of priority, the following effects are provided. Specifically, the generation of the tone signal based upon the performance data having higher priority order can be left to the last, whereby an important part of the first music piece can be left even at the end section of the first music piece, resulting in that the first music piece can be ended leaving its feature.

Another feature of the present invention is that the assignment controller assigns, in accordance with the predetermined priority order specified by the channel information included in the second performance data, the generation of the tone signal based upon the performance data of the second music piece one after another from the tone generating channel in which the fade-out of the tone signal generated by the performance data of the first music piece is ended earlier. This makes it possible to generate the tone signal having higher priority order based upon the performance data of the second music piece from the beginning. Therefore, an important part of the second music piece can be emerged even at the beginning section of the second music piece, so that the second music piece can be started with its feature.

The predetermined order of priority relating to the first and second music pieces is, for example, determined by priority data indicating the priority of plural tone generating channels indicated by the channel information for every music piece. The priority data is formed as follows. For example, a maker of the performance data judges the musical importance (e.g., degree of importance of a main melody, base, rhythm or the like) for each of plural parts composing a music piece and determines the order of priority, whereby the priority data in which the tone generating channel generating a tone signal belonging to each part and the order of priority of each part are associated with each other is recorded beforehand with the performance data upon forming the performance data.

Alternately, a computer may automatically analyze the performance data by a program process and may automatically determine the order of priority of each tone generating channel based upon the result of analysis, whereby the priority data indicating the order of priority of each tone generating channel may be recorded beforehand with the performance data as associated with the tone generating channel. In this case, the order of priority is automatically determined in accordance with a standard determined beforehand, such as the order of priority is set higher as the volume designated by the performance data is greater or as the frequency of the generation of the tone signal by the performance data is higher. Further, a user forms the priority data in accordance with the instruction by the computer program and gets the priority data recorded as associated with the performance data, when he/she selects a music piece or when he/she decides the order of priority and instructs the same.

Still another feature of the present invention is to provide a temporal storage portion that, when the performance data of the second music piece is read out for setting the generation environment of the tone signal with the state where the generation of the tone signal based upon the read-out performance data of the second music piece cannot be assigned to any one of tone generating channels of the tone generating circuit, temporarily stores the performance data for setting the generation environment of the tone signal; and a stored performance data output portion that outputs the temporarily stored performance data for setting the generation environment of the tone signal to the tone generating circuit, when a condition is established in which the generation of the tone signal based upon the read-out performance data of the second music piece can be assigned to any one of the tone generating channels of the tone generating circuit. In this case, the performance data for setting the generation environment of the tone signal is the one for controlling a musical tone element such as a tone color, volume and pitch bend amount of a generated tone, an effect given to the generated tone, sound mode (poly mode/mono mode) of the generated tone, or the like. Examples of the performance data with the MIDI standard include a program change, channel volume, bank select, parameter control, mode message or the like.

According to this, when the performance data of the second music piece is read out for setting the generation environment of the tone signal with the state where the generation of the tone signal based upon the performance data of the second music piece cannot be assigned to any one of tone generating channels of the tone generating circuit, the performance data is temporarily stored. Then, at the point when the generation of the tone signal based upon the read-out performance data of the second music piece can be assigned to any one of the tone generating channels of the tone generating circuit, the temporarily stored performance data is outputted to the tone generating circuit. Accordingly, the generation environment of the tone signal based upon the performance data of the second music piece after that is in accordance with the performance data of the second music piece for setting the generation environment of the tone signal temporarily stored and outputted to the tone generating circuit, so that the tone signal based upon the performance data of the second music piece is generated under an appropriate environment.

The present invention is not limited to be embodied as an automatic performance apparatus, but can be embodied as a computer program or method applied to this apparatus.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 7(A) and (B) are characteristic views showing a time change in a fade-out volume according to the first embodiment of the present invention;

FIG. 8 is a characteristic view showing a time change in a fade-in volume according to the first embodiment of the present invention;

FIG. 9(A) is a format diagram of a first channel assignment table;

FIG. 9(B) is a format diagram of a second channel assignment table;

DESCRIPTION OF THE PREFERRED EMBODIMENT

First Embodiment

Figure 1:
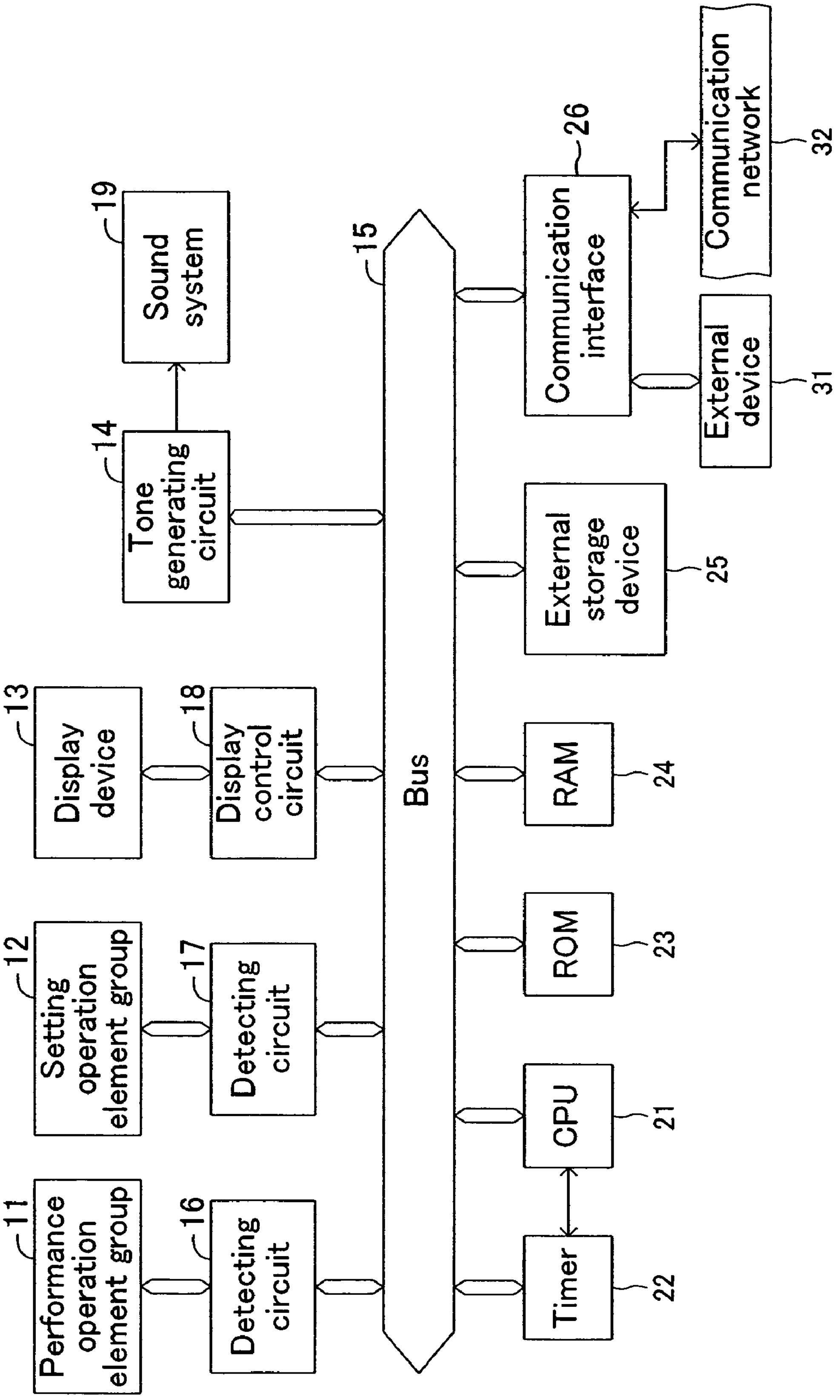
FIG. 1 is an entire block diagram of an electronic musical instrument according to first and second embodiments of the present invention.

The first embodiment of the present invention will be explained hereinafter with reference to the drawings. FIG. 1 is a block diagram schematically showing an electronic musical instrument having an automatic performance function according to the first embodiment. This electronic musical instrument has a performance operation element group 11, setting operation element group 12, display device 13 and tone generating circuit 14.

The performance operation element group 11 is composed of plural performance operation elements (e.g., plural keys) for designating a pitch of a generated tone. The operation of each performance operation element is detected by a detecting circuit 16 connected to a bus 15. The setting operation element group 12 is provided at an operation panel of this electronic musical instrument and is composed of plural setting operation elements for designating an operation manner of each portion of the electronic musical instrument. The operation of each setting operation element is detected by a detecting circuit 17 connected to the bus 15. The display device 13 is composed of a liquid crystal display, CRT or the like. It displays a character, number, diagram, or the like. The display manner of this display device 13 is controlled by a display control circuit 18 connected to the bus 15.

The tone generating circuit 14 is connected to the bus 15 and has plural (16 in this embodiment) tone generating channels. Each of the tone generating channels generates a tone signal based upon performance data (MIDI message) supplied under the control of a later-described CPU 21 and outputs the resultant to a sound system 19. Further, in the tone generating circuit 14, the generation environment of the generated tone signal, such as a tone color, volume, effect or the like, is also set under the control of the performance data (MIDI message). The sound system 19 includes speakers, amplifiers or the like. It sounds out a tone corresponding to the tone signal.

This electronic musical instrument has the CPU 21, timer 22, ROM 23 and RAM 24, each of which is connected to the bus 15 to compose a main section of a microcomputer. The electronic musical instrument is further provided with an external storage device 25 and a communication interface circuit 26. The external storage device 25 includes a hard disk HD and flash memory that are incorporated beforehand in this electronic musical instrument, various recording mediums such as a compact disk CD, flexible disk FD or the like that can be inserted into the electronic musical instrument, and a drive unit corresponding to each recording medium. The external storage device 25 can store and read a large quantity of data and programs.

Figure 2:
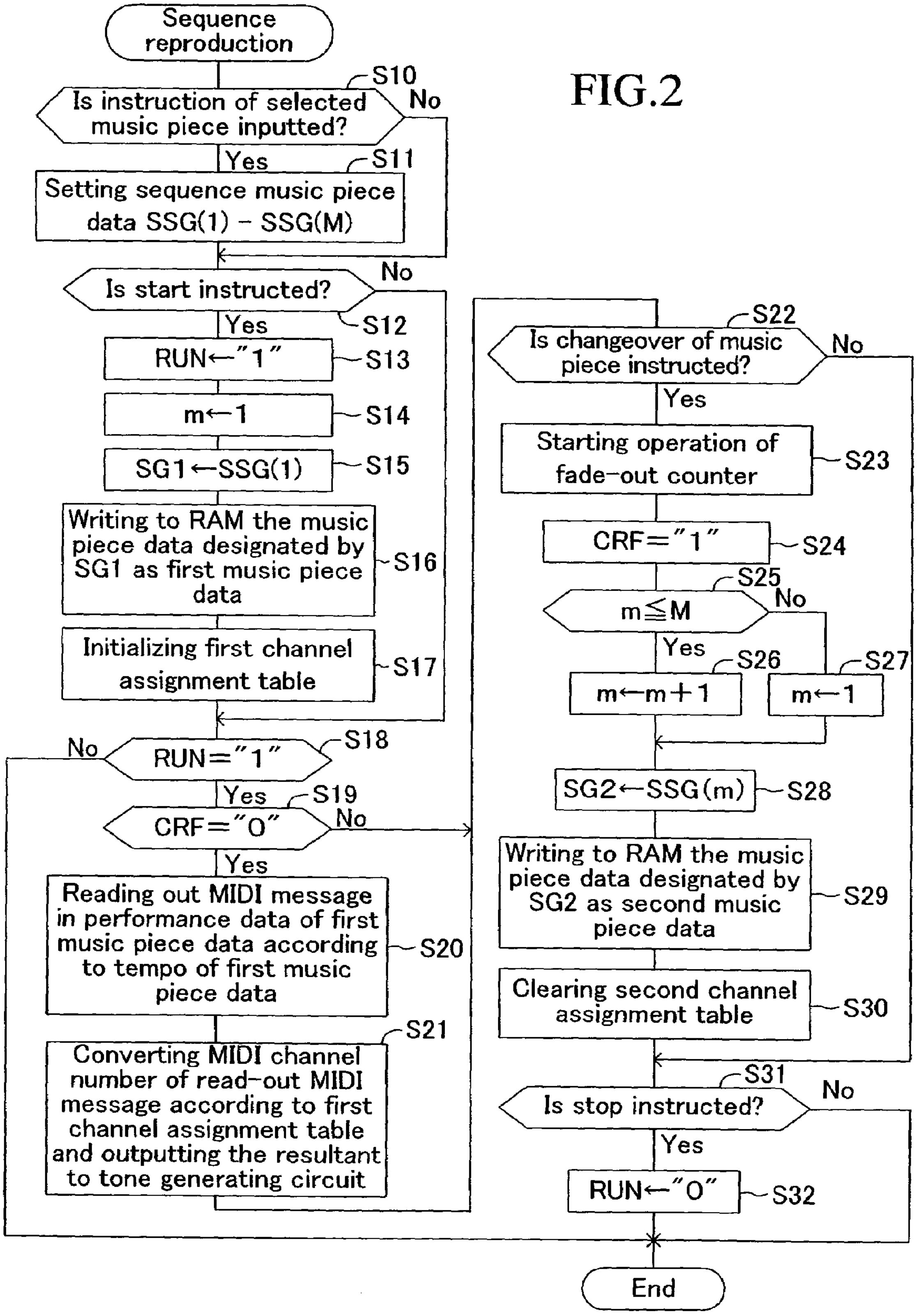
FIG. 2 is a flowchart showing a sequence reproduction program executed in the electronic musical instrument according to the first embodiment.
Figure 3:
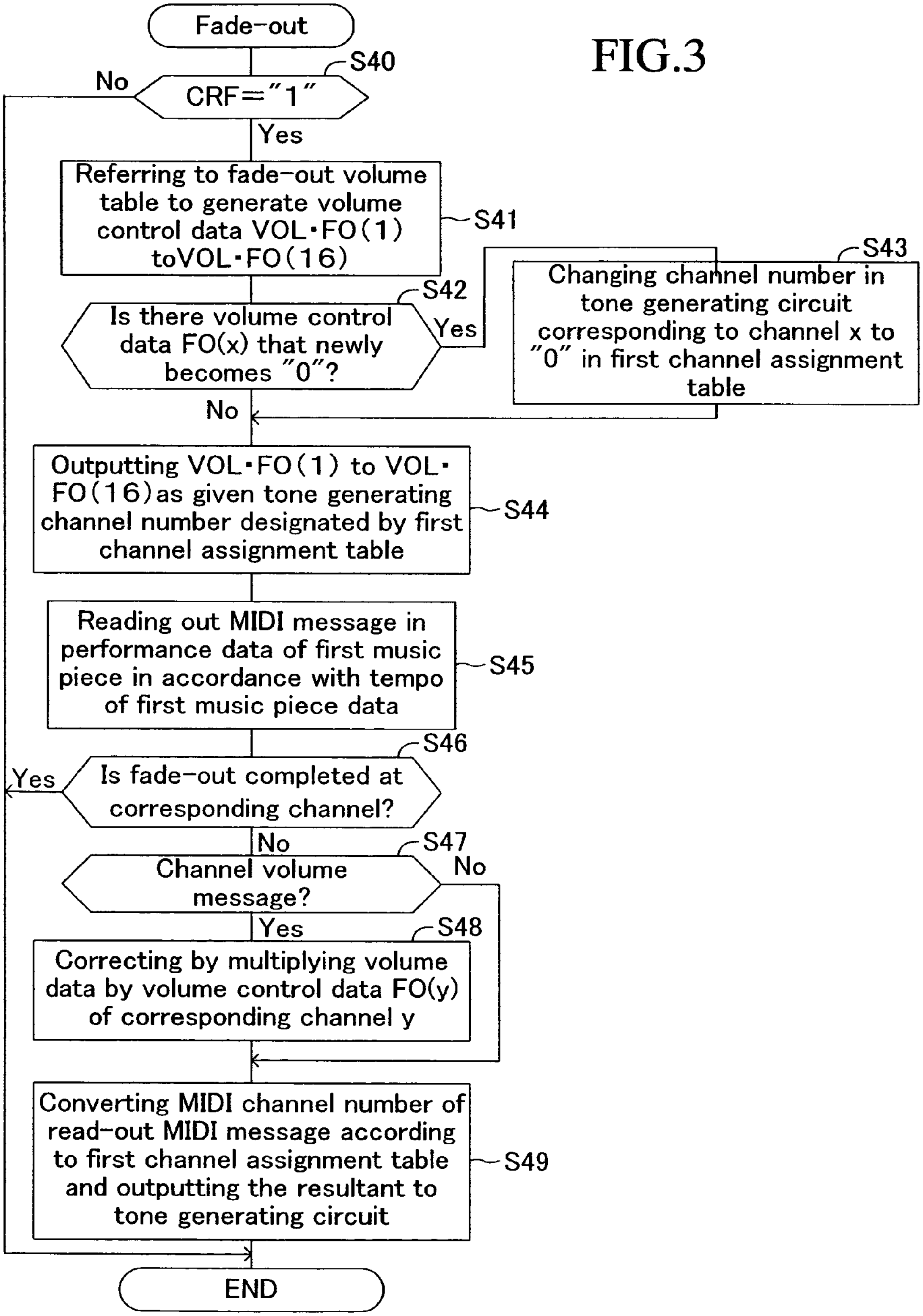
FIG. 3 is a flowchart showing a fade-out program executed in the electronic musical instrument according to the first embodiment.
Figure 4:
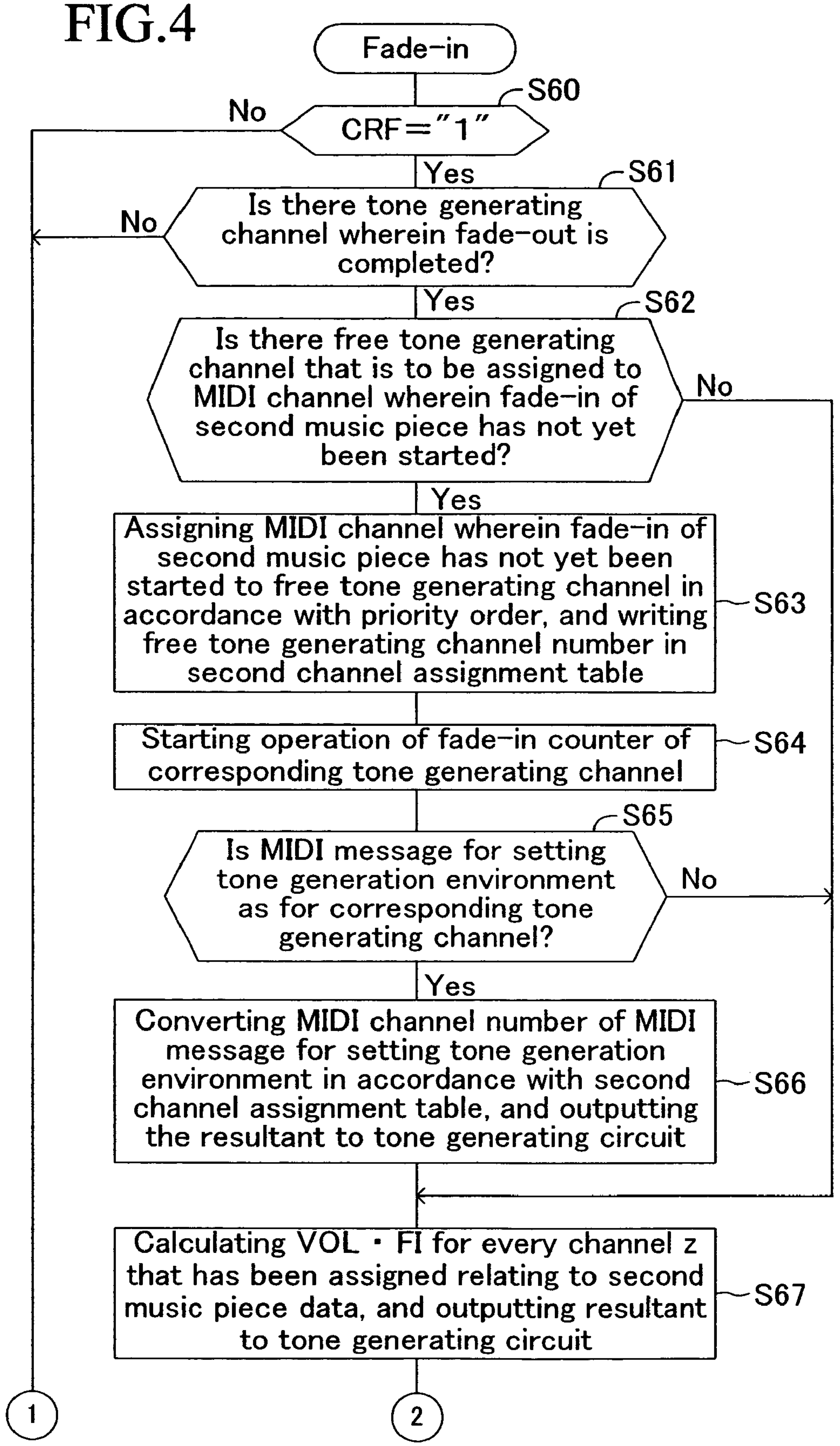
FIG. 4 is a flowchart showing a former half of a fade-in program executed in the electronic musical instrument according to the first embodiment.
Figure 5:
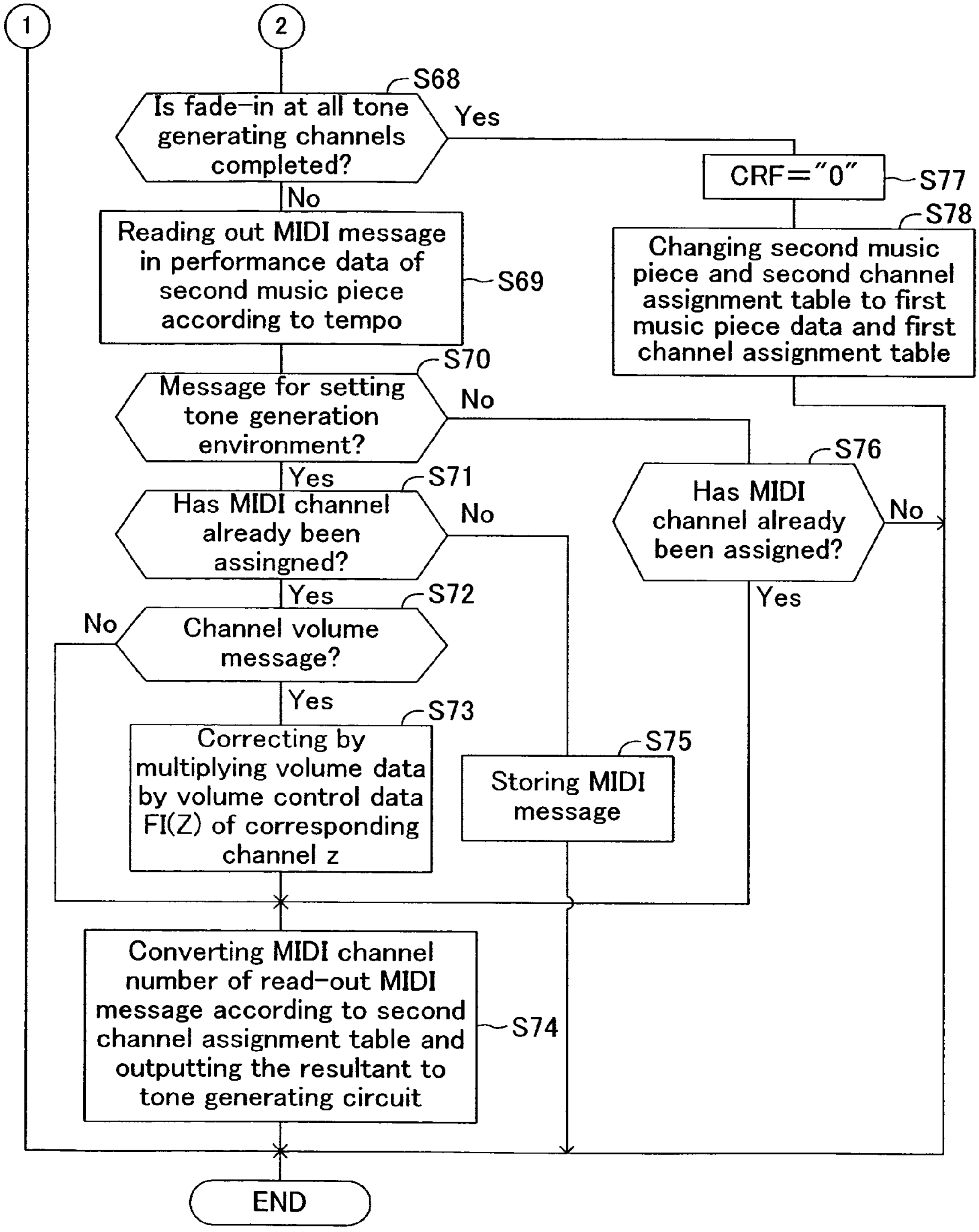
FIG. 5 is a flowchart showing a latter half of a fade-in program executed in the electronic musical instrument according to the first embodiment.

In this first embodiment, in particular, the hard disk HD and flash memory store a sequence reproduction program shown in FIG. 2, fade-out program shown in FIG. 3, fade-in program shown in FIGS. 4 and 5 and other programs. This hard disk HD and flash memory further store plural pieces of music data each corresponding to each music piece, fade-out volume table and fade-in volume table. The programs and data pieces may be stored beforehand in a hard disk HD or in a flash memory, may be supplied to the hard disk HD or to the flash memory from a compact disk CD or flexible disk FD, or may be externally supplied to the hard disk HD or to the flash memory via a later-described external device 31 or communication network 32.

Figure 6:
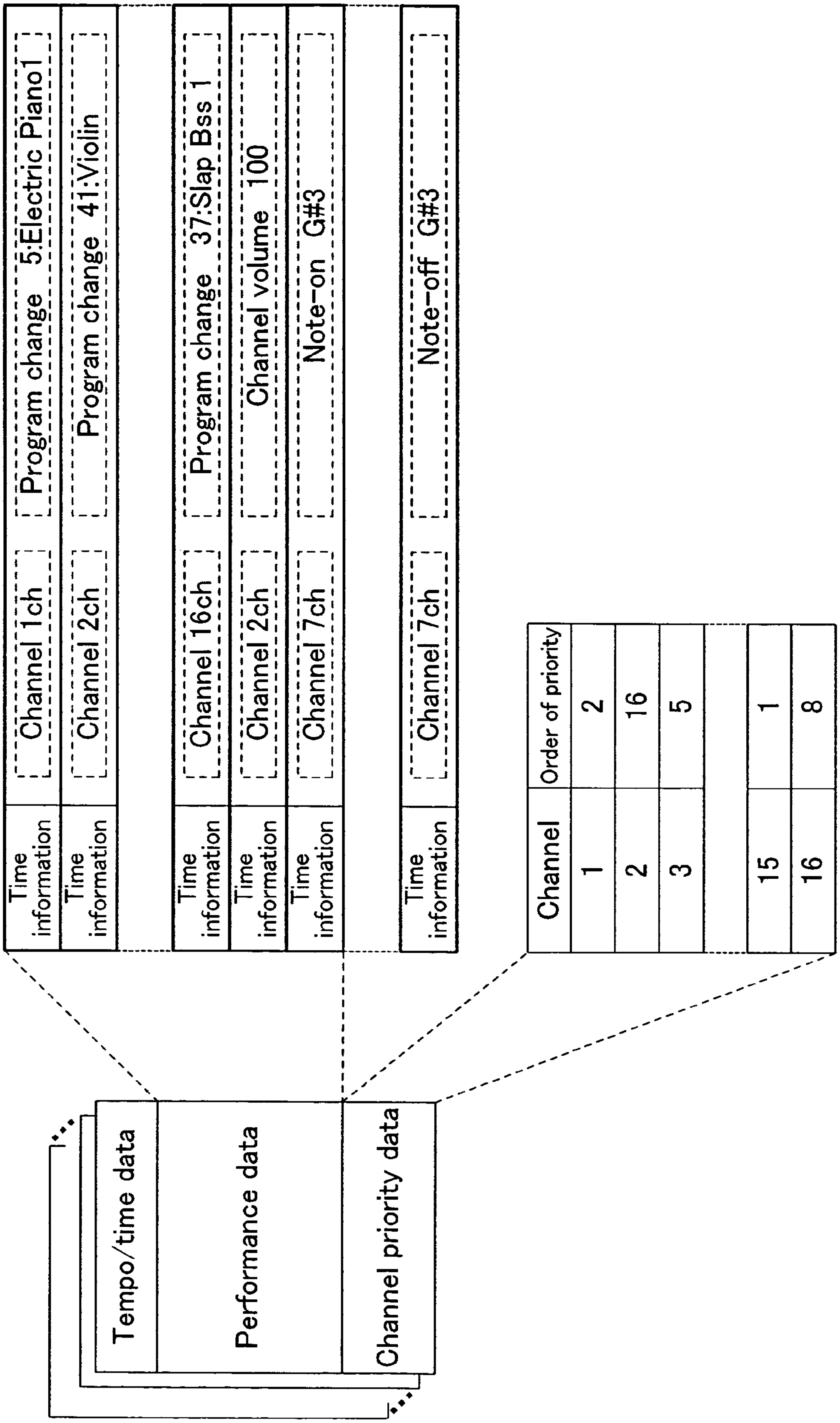
FIG. 6 is a view showing one example of a format of music piece data according to first and second embodiments.

Each piece of music data is composed of tempo/time data, performance data, channel priority data or the like as shown in FIG. 6. The tempo/time data includes information indicating a tempo and time of the music piece. The performance data is composed of plural MIDI messages arranged in accordance with a lapse of time. Each MIDI message is composed of time information, channel information and event information. The time information indicates an output timing of each MIDI message. The channel information indicates a number (in this embodiment, number 1 to number 16) of the tone generating channel of the tone generating circuit 14 to which the event information is assigned. The event information includes a program change, channel volume, note-on and note-off.

The program change is generally a control event that sets a tone color of the generated tone signal. The channel volume is a control event that sets a volume of the generated tone signal. The program change and channel volume are included, with a bank select, parameter control and mode message that control the other tone elements such as a pitch bend amount of the generated tone, an effect given to the generated tone and sound mode (poly-mode/mono-mode) of the generated tone, in the MIDI message (i.e., performance data) for setting the generation environment of the tone signal. The note-on instructs the start of the generation of the tone. It is composed of instruction information indicating the aforesaid instruction and a note chord indicating a pitch of the tone. The note-off instructs an end of the generation of the tone. It is composed of instruction information indicating the aforesaid instruction and a note chord indicating a pitch of the tone.

The channel priority data is composed of priority order information indicating an order of priority as associated with each of the channel numbers 1 to 16 indicated by the channel information. Although the priority order information independently indicates the order of priority of 16 channel numbers in this embodiment, the same order of priority may be given to plural channel numbers and the order of priority may be indicated by values less than 16. As for this channel priority data, for example, a maker of the performance data judges the musical importance (e.g., degree of importance of a main melody, base, rhythm or the like) for each of plural parts composing a music piece and determines the order of priority, whereby the channel number for generating the tone signal belonging to each part and the order of priority of each part are recorded beforehand with the performance data upon forming the performance data as associated with each other.

Alternately, the CPU 21 may automatically analyze the performance data by the execution of an unillustrated program and may automatically determine the order of priority of each channel number based upon the result of analysis, whereby the priority data indicating the order of priority of each channel number may be recorded beforehand with the performance data. In this case, the order of priority is automatically determined in accordance with a standard determined beforehand, such as the order of priority is set higher as the volume designated by the performance data is great or as the frequency of the generation of the tone signal by the performance data is higher. Further, a user forms the priority data in accordance with the instruction by the computer program and gets the priority data recorded as associated with the performance data, when he/she selects a music piece or when he/she decides the order of priority and instructs the same.

As shown in FIG. 7(A), the fade-out volume table stores, for every priority data (order of priority), volume control data FO that gradually decreases with a lapse of time from the start of the fade out in order to fade out the reproduced tone of the music piece. The volume control data FO is determined such that the volume is rapidly decreased as the order of priority becomes low. Instead of immediately decreasing all volumes from the start of the fade-out as shown in FIG. 7(A), such configuration may be applied as shown in FIG. 7(B) wherein the volume control data FO is kept to be a constant value in a predetermined time from the start of the fade-out for a part of the reproduced tone having higher priority or all reproduced tones, and then, the volume control data FO is gradually decreased. In this case, the higher the priority is, the longer the predetermined time becomes. The fade-in volume table stores, as shown in FIG. 8, volume control data FI that gradually increases with a lapse of time from the start of the fade-in in order to fade in the reproduced tone of the music piece.

The communication interface circuit 26 can be connected to the external device 31 such as other electronic musical instruments, personal computer or the like, whereby this electronic musical instrument can communicate various programs and data with the external device 31. The communication interface circuit 26 can also be connected to the outside via a communication network 32 such as the Internet, whereby this electronic musical instrument can receive or send various programs and data from or to the outside.

Subsequently, the operation of the first embodiment having the above-mentioned configuration will be explained. When a user operates the setting operation element group 12 to start the sequence program shown in FIG. 2, the CPU 21 starts to repeatedly execute this sequence program every predetermined short period.

When a user operates the setting operation element group 12 to instruct an input of a selected music during this sequence program, the CPU 21 makes "YES" determination at Step S10, and then, displays an input screen of the selected music on the display device 13 for causing the user to select, in the order of reproduction, the music piece that should be continuously reproduced at Step S11. When the user operates the setting operation element group 12 to sequentially select desired plural music pieces among plural pieces of music piece data stored in the hard disk HD (or flash memory), music piece designating data SSG that sequentially indicates the selected plural music pieces are stored in the RAM 24 as sequence music piece data SSG(1), SSG(2), . . . SSG(M). In case where the user demands music piece data that is not recorded on the hard disk HD or others, the desired music piece data is externally inputted via the external device 31 or communication network 32 and the resultant is recorded on the hard disk HD. Then, the music piece designating data SSG for designating this recorded music piece data is added to the sequence music piece data SSG(1), SSG(2), . . . SSG(M). It should be noted that M is a number of the music piece selected by the user, which means that M indicates the number of the music piece that is to be continuously reproduced.

When the user operates the setting operation element group 12 to instruct a start after plural music pieces that should be continuously reproduced are selected as described above, "YES" determination is made at Step S12, whereby the reproduction of the head music piece is prepared by the processes at Steps S13 to S17. An operation flag RUN is set to "1" at Step S13. The operation flag RUN indicates the operation state of the sequence reproduction of the music piece when the value thereof is "1", while it indicates a stop state of the sequence reproduction of the music piece when the value thereof is "0". It is set to "0" by an unillustrated initialization at the beginning. At Step S14, a music piece order variable m that indicates the order of the music piece designating data SSG that should be reproduced in the sequence music piece data SSG(1), SSG(2), . . . SSG(M) is set to "1". At Step S15, the first music piece designating data SG1 is set to the music piece designating data SSG(1) that is the head of the sequence music piece data SSG(1), SSG(2), . . . SSG(M). The first music piece designating data SG1 indicates the current reproduced music piece before the changeover operation of the music piece in the sequence reproduction is not started, while it indicates a music piece whose reproduction is stopped, i.e., a music piece that is faded out as specifically described later, after the changeover operation of the music piece is started.

At Step S16, the music piece data (see FIG. 6) corresponding to the music piece designated by the first music piece designating data SG1 is transferred to the RAM 24 from the hard disk HD and stored in the RAM 24 as the first music piece data. At Step S17, a first channel assignment table prepared in the RAM 24 is initialized by an unillustrated initialization processing. This first channel assignment table is for associating the channel information in the MIDI message relating to the first music piece data in the RAM 24 with the tone generating channel in the tone generating circuit 14 as shown in FIG. 9(A). In other words, it stores, as associated with the channel information in the MIDI message, the channel number designating the tone generating channel in the tone generating circuit 14 when the event information that makes a pair with the channel information is outputted to the tone generating circuit 14. At Step S17, the channel number indicating the tone generating channel in the tone generating circuit 14 is matched to each of all channel numbers indicated by the channel information in the MIDI message relating to the first music piece data, as shown in the left column in FIG. 9(A). The channel information in the MIDI message or the channel number indicated by the channel information is hereinafter referred to as an MIDI channel number, and the number of the tone generating channel in the tone generating circuit 14 is referred to as a tone generating channel number.

When the preparation of the reproduction of the head music piece is completed by the processes at Steps S13 to S17, "YES" determination is made, i.e., the operation flag RUN is determined to be "1" at Step S18, and then, it is determined at Step S19 whether a cross fade flag CRF is "0" or not. The cross fade flag CRF indicates the cross-fade state when the value thereof is "1", while it indicates non-cross-fade state when the value thereof is "0". It is set to "0" at the beginning by an unillustrated initialization. Accordingly, "YES" determination is made at Step S19, whereby the processes at Steps S20 and S21 are executed. At Step S20, the MIDI message in the first music piece data in the RAM 24 is read out one after another in accordance with the progression of the music piece. In this case, the progression of the music piece is decided according to the tempo in the first music piece data. At Step S21, the first channel assignment table is referred to, whereby the channel number in the read-out MIDI message is changed to the tone generating channel number, and the MIDI message including the changed channel number is outputted to the tone generating circuit 14. Since the MIDI channel number of the first channel assignment table and the tone generating channel number are agreed with each other like the initialization at Step S17, the read-out MIDI message is outputted intact to the tone generating circuit 14.

The tone generating circuit 14 receives the outputted MIDI message to supply the event information included in the MIDI message to the tone generating channel designated by the MIDI channel number. Then, the tone generating circuit 14 controls the start of the generation of the tone, end of the generation of the tone or environment setting of the generated tone in the designated tone generating channel in accordance with the supplied event information. According to this, the tone generating circuit 14 generates a tone signal in accordance with the performance data in the first music piece data in the RAM 24 and sounds out a tone corresponding to the generated tone signal via the sound system 19. Accordingly, the performance data in the first music piece data in the RAM 24 is reproduced.

When the changeover of the music piece is instructed during the reproduction of the performance data in the first music piece data, the CPU 21 makes "YES" determination at Step S22, and then, executes processes at Step S23 and the following Steps. The instruction of the changeover of the music piece is made after a fixed period has been elapsed from the start of the reproduction of a new music piece by the execution of an unillustrated time measuring program executed simultaneous with the sequence reproduction program. The continuous reproduction of plural music pieces is generally performed such that the reproduction by a fixed period from the head is sequentially executed to each music piece. Therefore, a time measurement is started from the start of the reproduction of each music piece, and the changeover instruction may be given at the point when the measured time reaches a predetermined time. In case where a user operates the setting operation element group 12 to demand the stop of the reproduction of the music piece, which is currently reproduced, before the changeover instruction by the time measurement as described above is given, it is determined that there is the changeover instruction of the music piece, i.e., "YES" determination is made at Step S22, and then, the processes at Step S23 and the following Steps are executed.

At Step S23, an operation of a fade-out counter is started for measuring a period from the start of the changeover instruction of the music piece. This fade-out counter successively counts up after that by the execution of an unillustrated program for every predetermined short period, thereby measuring a time from the start of the changeover. Subsequently, the cross-fade flag CRF is set to "1" at Step S24.

After the process at Step S24, the music piece order variable m is changed by the processes at Steps S25 to S27. If the music piece order variable m does not indicate the last order of the music piece in the sequence music piece data SSG(1), SSG(2), . . . SSG(M), "1" is added to the music piece order variable m. Further, if the music piece order variable m indicates the last order of the music piece in the sequence music piece data SSG(1), SSG(2), . . . SSG(M), the music piece order variable m is set to "1" that indicates the head music piece data SSG (1). Then, at Step S28, the second music piece designating data SG2 is set to the music piece designating data SSG(m) designated by the music piece order variable m. This second music piece designating data SG2 indicates a music piece whose reproduction is started when the changeover operation of the music piece is started in the sequence reproduction, i.e., indicates a music piece that is to be faded in as specifically described later.

At Step S28, the music piece data (see FIG. 6) corresponding to the music piece designated by the second music piece designating data SG2 is transferred to the RAM 24 from the hard disk HD and stored in the RAM 24 as the second music piece data. At Step S30, a second channel assignment table prepared in the RAM 24 is cleared by an unillustrated initialization. This second channel assignment table is for associating the MIDI channel number relating to the second music piece data in the RAM 24 with the tone generating channel number, like the above-mentioned first channel assignment table (see FIG. 9(B)). At the process at Step S30, all of the tone generating channel numbers are set to "0" with respect to all channel numbers indicated by the MIDI channel number relating to the second music piece data, as shown in the left column in FIG. 9(B). In this case, "0" indicates no tone generating channel in the tone generating circuit 14. Therefore, clearing the second channel assignment table means that the MIDI message of the second music piece data is not assigned to any one of the tone generating channels in the tone generating circuit 14.

On the other hand, the CPU 21 repeatedly executes the fade-out program shown in FIG. 3 for every predetermined short period in simultaneous with the sequence reproduction program. When it is before the changeover instruction of the music piece and the cross-fade flag CRF is set to "0", "NO" determination is made at Step S40, so that the substantial process is not executed. When the changeover of the music piece is instructed and the cross-fade flag CRF is changed to "1", "YES" determination is made at Step S40, and then, the processes at Step S41 and the following Steps are started to be executed.

In the fade-out program, the fade-out volume table is referred to at Step S41 for generating volume control data VOL·FO(1) to VOL·FO(16) corresponding to each channel of the MIDI message. In the generation of the volume control data VOL·FO(1) to VOL·FO(16), the priority order information corresponding to the channel numbers 1 to 16 is firstly taken out from the priority data relating to the first music piece data in the RAM 24. Then, the type of the volume control data FO stored in the fade-out volume table is specified for every taken-out priority order information, whereby the volume control data FO at the time designated by the fade-out counter is calculated. Then, the predetermined volume value VOL determined beforehand is multiplied by the volume control data FO(1) to FO(16), thereby generating volume control data VOL·FO(1) to VOL·FO(16) corresponding respectively to the priority order information (channel number 1 to 16). As this predetermined volume value VOL, a value optionally designated by a user or a value instructed by the volume adjusting operation element in the setting operation element group 12 may be applied.

Subsequently, it is determined at Step S42 whether there is volume control data FO(x) that newly becomes "0" among the calculated volume control data pieces FO(1) to FO(16). Since all pieces of volume control data FO(1) to FO(16) do not become "0" immediately after the start of the changeover operation of the music piece in this case, "NO" determination is made at Step S42, and then, the program proceeds to Step S44. At Step S44, the tone generating channel number designated by the first channel assignment table is given to the calculated volume control data pieces VOL·FO(1) to VOL·FO(16), and the resultant is outputted to the tone generating circuit 14. In other words, the first channel assignment table is referred to, whereby the channel numbers 1 to 16 of the volume control data pieces VOL·FO(1) to VOL·FO(16) are converted into the assignment channel numbers of the tone generating circuit 14, and the resultant is outputted to the tone generating circuit 14. As for the channel x wherein the channel number of the tone generating circuit 14 is set to "0" in the first channel assignment table, i.e., as for the channel x of the tone generating circuit 14 wherein the fade-out in the reproduction of the first music piece data is completed, the channel number of the volume control data VOL·FO(x) is not converted and the output is not carried out to the tone generating circuit 14. Therefore, the calculation of the volume control data VOL·FO(x) may be omitted as for the channel x even in the process at Step S41. The reason why the volume control data pieces VOL·FO(1) to VOL·FO(16) are outputted to the tone generating circuit 14 is that the MIDI message indicating a channel volume deciding the volume of the reproduced tone does not always exist in the music piece data, or does not always exist at the timing required for the reproduction of the music piece.

After the process at Step S44, the MIDI message in the first music piece data in the RAM 24 is sequentially read out with the progression of the music piece. In this case too, the progression of the music piece is decided according to the tempo in the first music piece data. It is determined at Step S46 whether the fade-out at the channel designated by the MIDI channel number of the read-out MIDI message is completed or not. This determination will be described in detail later. Since all channels are being faded out immediately after the changeover operation of the music piece, "NO" determination is made at Step S46, and the program proceeds to Step S47.

It is determined at Step S47 whether the read-out MIDI message is a channel volume or not. If the read-out MIDI message is a channel volume, the volume parameter VOL of the channel volume is corrected at Step S46 with the volume control data FO(y) of the corresponding channel, and then, the program proceeds to Step S49. In the correction of the volume parameter, the priority order information corresponding to the channel number y is taken out from the channel priority data pieces relating to the first music piece in the RAM 24, whereby the type of the volume control data FO stored in the fade-out volume table is specified by the taken-out priority order information, thereby calculating the volume control data FO(y) at the time designated by the fade-out counter. Then, the volume control data FO(y) is multiplied by the volume parameter of the read-out channel volume, thereby correcting the volume parameter VOL of the channel volume to the volume control data VOL·FO(y). As for the channel whose channel volume is read out as the MIDI message after the changeover instruction of the music piece is given, this volume parameter VOL is used instead of the predetermined volume value VOL at the processes at Step S41 and the following Steps. If the read-out MIDI message is not the channel volume, "NO" determination is made at Step S47, and then, the program directly proceeds to Step S49.

At Step S49, the first channel assignment table is referred to, whereby the MIDI channel number in the read-out MIDI message (if the MIDI message is a channel volume, MIDI message corrected by the process at Step S48) is changed to the tone generating channel number, and then, the MIDI message including the changed MIDI channel number is outputted to the tone generating circuit 14. The tone generating circuit 14 receives the outputted MIDI message to supply the event information included in the MIDI message to the tone generating channel designated by the MIDI channel number. Then, the tone generating circuit 14 controls the start of the tone generation, end of the tone generation or environment setting of the generated tone at the designated tone generating channel, in accordance with the supplied event information. This allows the tone generating circuit 14 to generate a tone signal in accordance with the performance data in the first music piece data in the RAM 24 and sound out the tone corresponding to the generated tone signal via the sound system 19, like the above-mentioned case.

However, in this case, the volume control data pieces VOL·FO(1) to VOL·FO(16) and VOL·FO(y) are outputted to each tone generating channel in the tone generating circuit 14 by the processes at Steps S44 and S48, so that the volume of the tone signal generated at each tone generating channel in the tone generating circuit 14 is decided by the volume control data pieces VOL·FO(1) to VOL·FO(16) and VOL·FO(y). On the other hand, the volume control data FO in the fade-out volume table is set so as to gradually decrease with the lapse of time after the instruction of the changeover operation of the music piece as well as set such that the volume of the tone signal having lower priority is more quickly decreased. Accordingly, the volume of the tone signal relating to the first music piece data generated from each tone generating channel in the tone generating circuit 14 is gradually decreased, and the volume of the tone signal having lower priority is more quickly decreased, after the changeover instruction of the music piece is given.

In case where there is the volume control data FO(x) that newly becomes "0" among the volume control data pieces FO(1) to FO(16) calculated by the process at Step S41 by the repeated execution of such fade-out program, "YES" determination is made at Step S42, and then, the program proceeds to Step S43. At Step S43, the tone generating channel number corresponding to the MIDI channel number x whose volume control data FO(x) newly becomes "0" is changed to "0" in the first channel assignment table (see the central column in FIG. 9(A)). The tone generating channel number "0" means that the fade-out of the reproduction of the performance data relating to the MIDI channel x of the first music piece data is completed, i.e., that the performance data relating to the MIDI channel number x in the first music piece data is not assigned to any one of the tone generating channels in the tone generating circuit 14 after that.

Thus, the volume control data VOL·FO(x) is not outputted even by the process at Step S44, as for the channel wherein the fade-out in the reproduction of the first music piece is completed. Further, the MIDI message relating to the channel wherein the fade-out is completed is not outputted to the tone generating circuit 14 even by the process at Step S46. In this way, the fade-out process in the reproduction of the first music piece data is sequentially completed from the channel having lower priority toward the channel having higher priority. Finally, the fade-out of the tone signal of all channels is completed in the reproduction of the first music piece data, and all channel numbers of the tone generating circuit 14 in the first channel table are rewritten to "0" (see the right column in FIG. 9(A)).

The CPU 21 repeatedly executes the fade-in program in FIGS. 4 and 5, for every predetermined short period, with the sequence reproduction program and fade-out program. When it is before the changeover instruction of the music piece and the cross-fade flag CRF is set to "0", "NO" determination is made at Step S60, so that the substantial process is not executed. When the changeover of the music piece is instructed and the cross-fade flag CRF is changed to "1", "YES" determination is made at Step S60, and then, the processes at Step S61 and the following Steps are started to be executed.

At Step S61, the first channel assignment table is referred to for searching whether the tone generating channel that is set to "0" is present or not, thereby determining that there is the tone generating channel wherein the fade-out is completed. If the tone generating channel wherein the fade-out is completed has not yet been present, "NO" determination is made at Step S61, so that the execution of the fade-in program is temporarily ended. On the other hand, if there is a tone generating channel wherein the fade-out is completed, "YES" determination is made at Step S61, and then, the program proceeds to Step S62.

It is determined at Step S62 whether there is a free tone generating channel to which the MIDI message relating to a channel wherein the fade-in has not yet been started in the second music piece data can be assigned. This determination is made under a condition wherein there is a channel number, among the channel numbers 1 to 16, that is not stored as the tone generating channel number in the first and second channel assignment tables. If this determination is affirmative, the CPU 21 executes the processes at Steps S63 to S66. On the other hand, if the determination is negative, the CPU 21 executes the process at Step S67 without executing the processes at Steps S63 to S66.

At Step S63, the MIDI message of the MIDI channel number wherein the fade-in has not been started in the second music piece data is assigned to the free tone generating channel in the tone generating circuit 14 according to the order of priority specified by the channel priority data, and the assigned tone generating channel number is written in the second channel assignment table. Specifically, the MIDI channel numbers that stores "0" as the tone generating channel number in the second channel assignment table are extracted, whereby the channel number having the highest priority is selected from the extracted channel numbers by referring to the channel priority data of the second music piece data. Then, the selected tone generating channel number (that is "0" before the change) having the highest priority in the second channel assignment table is changed to the channel number that is not stored as the tone generating channel in the first and second channel assignment tables (see the central column in FIG. 9(B)).

At Step S64, the fade-in counter relating to the assigned tone generating channel is started from "0". This fade-in counter measures, for every tone generating channel, the period from the start of the fade-in by the execution of an unillustrated program. After the process at Step S64, the processes at Steps S65 and S66 described later are executed, and then, the process at Step S67 is executed.

At Step S67, fade-in volume control data VOL·FI(z) is calculated, for every channel z that has been assigned relating to the second music piece data, and the resultant is outputted to the tone generating circuit 14. Specifically, the fade-in volume table whose characteristic is shown in FIG. 8 is referred to at Step S41 for calculating the volume control data FI(z) corresponding to the channel z to which the assignment has been completed relating to the second music piece data at the time designated by the fade-in counter. Then, a predetermined volume value VOL determined beforehand is multiplied by the volume control data FI(z). As this predetermined volume value VOL, a value optionally designated by a user or a value instructed by the volume adjusting operation element in the setting operation element group 12 may be applied. Then, the tone generating channel number designated by the second channel assignment table is given to the calculated volume control data pieces VOL·FI(z), and the resultant is outputted to the tone generating circuit 14. In other words, the second channel assignment table is referred to, whereby the channel number z to which the assignment has been completed is converted into the tone generating channel number, and the resultant is outputted to the tone generating circuit 14.

After the process at Step S67, it is determined at Step S68 whether the fade-in of all tone generating channels is completed or not under a condition in which there is no tone generating channel numbers indicating "0" in the second channel assignment table. Instead of this determination condition, such condition may be applied in which all tone generating channel numbers in the first channel assignment table are replaced with "0". Unless the fade-in of all the tone generating channels is completed, "NO" determination is made at Step S68, and then, the program proceeds to Step S69.

At Step S69, the MIDI message in the second music piece data in the RAM 24 is sequentially read out in accordance with the progression of the music piece. In this case, the progression of the music piece is decided according to the tempo in the second music piece data. It is determined at Step S70 whether the read-out MIDI message is a message for setting the generation environment of a tone signal such as a program change, channel volume, bank select, parameter control, mode message, or the like. If the read-out MIDI message is a message for setting the generation environment of a tone signal, "YES" determination is made at Step S70, and the program proceeds to Step S71.

It is determined at Step S71 whether the channel of the read-out MIDI message has already been assigned to any one of the tone generating channels of the tone generating circuit 14. Specifically, the second channel assignment table is referred to, whereby the channel of the MIDI message has already been assigned to any one of the tone generating channels under a condition in which the tone generating channel number corresponding to the MIDI channel number in the read-out MIDI message is not "0". If already assigned, "YES" determination is made at Step S71, and then, the program proceeds to Step S72.

It is determined at Step S72 whether the read-out MIDI message is a channel volume or not. If the read-out MIDI message is a channel volume, the volume control data FI(z) of the corresponding channel number z is multiplied by the volume parameter VOL of the channel volume, thereby correcting the channel volume message, and then, the proceeds to Step S74. The value calculated by the process at Step S67 can be used as this volume control data FI(z). As for the channel whose channel volume is read out as the MIDI message after the start of the fade-in, this volume parameter VOL is used instead of the predetermined volume value VOL at the processes at Step S67 and the following Steps. If the read-out MIDI message is not the channel volume, "NO" determination is made at Step S72, and then, the program directly proceeds to Step S74.

At Step S74, the second channel assignment table is referred to, whereby the MIDI channel number in the read-out MIDI message (if the MIDI message is a channel volume, MIDI message corrected by the process at Step S73) is changed to the tone generating channel number, and then, the MIDI message including the changed MIDI channel number is outputted to the tone generating circuit 14. The tone generating circuit 14 receives the outputted MIDI message to supply the event information included in the MIDI message to the tone generating channel designated by the channel number. Then, the tone generating circuit 14 sets the generation environment of the tone signal at the designated tone generating channel, in accordance with the supplied event information.

On the other hand, unless the channel in the read-out MIDI message for setting the environment has not yet been assigned to any one of the tone generating channel in the tone generating circuit 14, "NO" determination is made at Step S71, whereby the read-out MIDI message is temporarily stored in the RAM 24 at Step S75. In case where the read-out MIDI message is temporarily stored in the RAM 24 as described above, it is supplied to the tone generating circuit 14 by the processes at Steps S65 and S66 at the time of controlling the start of the fade-in at Steps S62 to S66 in FIG. 4. Specifically, in case where the MIDI message is temporarily stored in the RAM 24, "YES" determination is made at Step S65, and the MIDI channel number in the stored MIDI message is changed to the tone generating channel number by referring to the first channel assignment table. Then, the MIDI message including the changed MIDI channel number is outputted to the tone generating circuit 14. The MIDI message temporarily stored is deleted after being outputted to the tone generating circuit 14.

If the read-out MIDI message is not the one for setting the generation environment of a tone signal as described above, but the one for instructing the start of the generation or end of the generation of the tone signal such as note-on or note-off, "NO" determination is made at Step S70, and then, the program proceeds to Step S76. It is determined at Step S76 whether the channel of the read-out MIDI message has already been assigned to any one of the tone generating channels in the tone generating circuit 14, like the determination process at Step S71. If not assigned, "NO" determination is made at Step S76, so that the execution of the fade-in program is temporarily ended. If assigned, "YES" determination is made at Step S76, and then, the program proceeds to Step S74.

At Step S74, the second channel assignment table is referred to, whereby the MIDI channel number in the read-out MIDI message is changed to the tone generating channel number, and then, the MIDI message including the changed MIDI channel number is outputted to the tone generating circuit 14. The tone generating circuit 14 receives the outputted MIDI message to supply the event information included in the MIDI message to the tone generating channel designated by the MIDI channel number. Then, the tone generating circuit 14 controls the start of the tone generation or the end of the tone generation of the tone at the designated tone generating channel, in accordance with the supplied event information. This allows the tone generating circuit 14 to generate a tone signal in accordance with the performance data in the second music piece data in the RAM 24 and sound out the tone corresponding to the generated tone signal via the sound system 19.

In this case, the volume control data pieces VOL·FI(1) to VOL·FI(16) and VOL·FI(z) are outputted to each tone generating channel in the tone generating circuit 14 by the processes at Steps S67 and S73, so that the volume of the tone signal generated at each tone generating channel in the tone generating circuit 14 is decided by the volume control data pieces VOL·FI(1) to VOL·FI(16) and VOL·FI(z). On the other hand, the volume control data FI in the fade-in volume table is set so as to gradually increase with the lapse of time after the start of the fade-in. Accordingly, the volume of the tone signal relating to the second music piece data generated from each tone generating channel in the tone generating circuit 14 is gradually increased, after the fade-in is started.

When a time has been elapsed from the changeover instruction of the music piece and the fade-in of all tone generating channels is completed, i.e., when the increase in the volume control data pieces FI(1) to FI(16) is stopped, "YES" determination is made at Step S68, and then, the processes at Steps S77 and S78 are executed. The cross-fade flag CRF is returned to "0" at Step S77. At Step S78, the second music piece data and the second channel assignment table in the RAM 24 are changed to the first music piece data and the first channel assignment table respectively, and then, the execution of the fade-in program is temporarily ended.

When the cross-fade flag CRF is set to "0", the substantial process is not executed in the fade-out program in FIG. 3 and the fade-in program in FIGS. 4 and 5, as described above. Then, the music piece whose fade-in is completed and that is changed to the first music piece data by the process at Step S78 is reproduced with the progression of the music piece data by the processes at Steps S18 to S21.

When a user operates the setting operation element group 12 during the sequence reproduction of the music piece data, to thereby instruct the stop of the sequence program, "YES" determination is made at Step S31, so that the operation flag RUN is returned to "0" for temporarily ending the execution of this sequence reproduction program. The music piece data is not reproduced so long as a start of a new sequence reproduction is instructed, since the operation flag RUN is set to "0".

Figure 10:
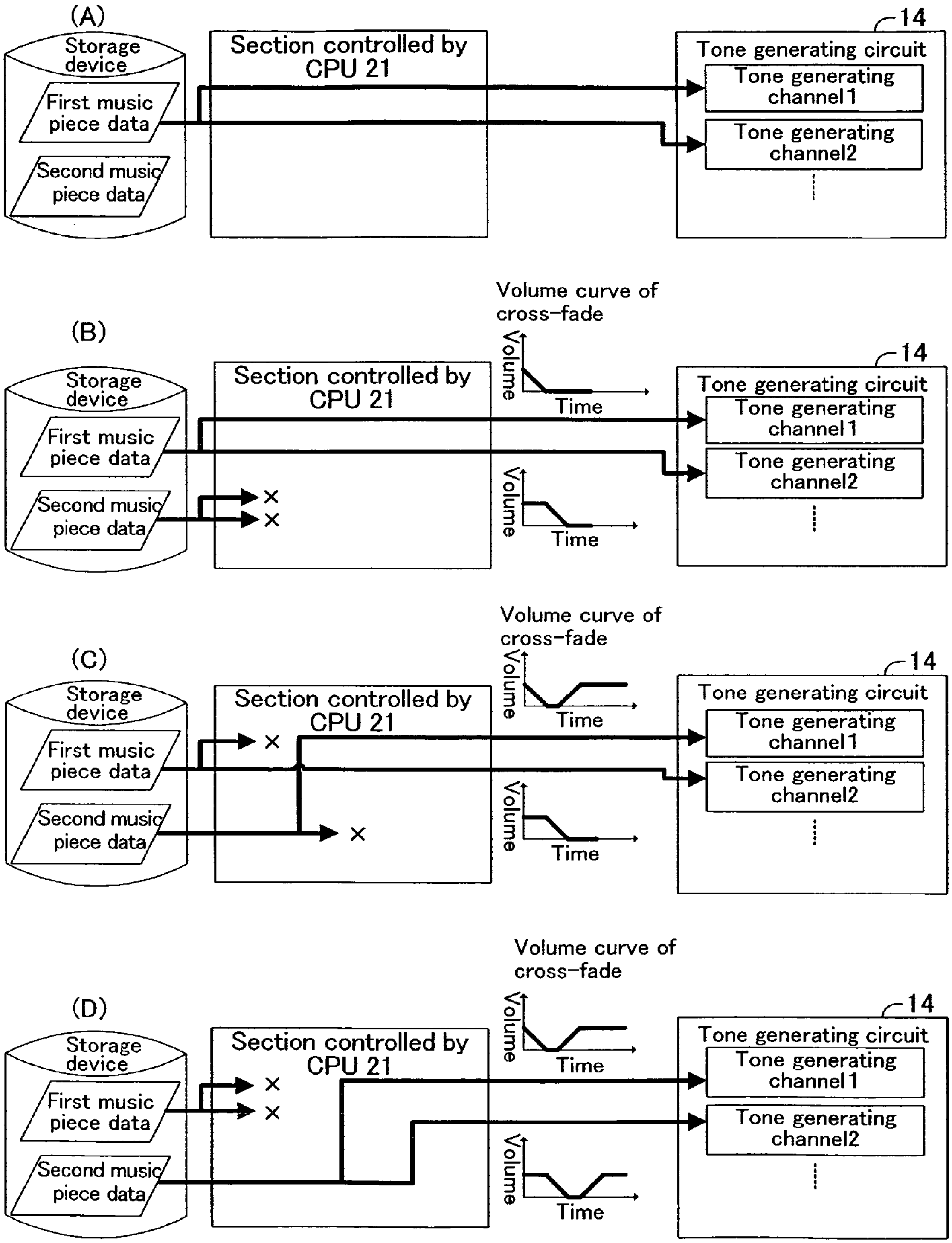
FIGS. 10(A) to (D) are operation explaining views for explaining an operation of the first embodiment.

As can be understood from the above-mentioned explanation about the operation, when the changeover of the music piece is instructed during the reproduction of the first music piece data (see FIG. 10(A)), the volume of the tone signal that is being generated at each tone generating channel is gradually decreased by the execution of the fade-out program in FIG. 3 (see FIG. 10(B)), according to the first embodiment. When the fade-out at any one of the tone generating channels is completed, the generation of the tone signal based upon the performance data in the next music piece data (i.e., second music piece data) is assigned, by the execution of the fade-in program in FIGS. 4 and 5, to the tone generating channel wherein the fade-out has been completed. The assigned tone signal is faded in with its volume gradually increasing (see FIG. 10(C)). Then, with the lapse of time, the tone signal based upon the performance data in the second music piece data is sequentially assigned to the tone generating channel wherein the fade-out has been completed, so that the tone signal is generated (see FIG. 10(D)). Specifically, the generation of the tone signal based upon the performance data in the first music piece data reproduced before the changeover takes priority to be assigned to the tone generating channel, while the tone signal based upon the performance data in the second music piece data that should be reproduced after the changeover is generated at the tone generating channel that is not utilized for the generation of the tone signal based upon the performance data in the first music piece data. Accordingly, the continuous reproduction of a music piece can be naturally changed over as cross-faded only by using a single tone generating circuit 14.

Further, in the fade-out, it is established that, the higher priority order the performance data has, the slower the decreasing speed of the volume of the generated tone signal is made, by using the channel priority data. In the fade-in, it is established that, the higher priority order the performance data has, the earlier it is assigned to the tone generating channel, by using the priority data. This makes it possible to leave the tone signal based upon the performance data having higher priority order in the first music piece data to the last, and to generate the tone signal based upon the performance data having higher priority order in the second music piece data from the beginning. Therefore, the features of two music pieces are not deteriorated upon the changeover of two music pieces.

In the first embodiment, as for the MIDI message for setting the generation environment of a tone signal such as a program change, channel volume, bank select, parameter control, mode message or the like, the MIDI message is temporarily stored by the processes at Steps S70, S71 and S75, in case where there is no tone generating channel to which it is assigned. After the tone generating channel to which the MIDI message is assigned appears, the temporarily stored MIDI message is outputted to the tone generating channel to which the MIDI message is newly assigned. According to this, the tone signal based upon the performance data in the music piece data after the changeover is generated under a suitable environment.

Second Embodiment

Subsequently, the second embodiment of the present invention will be explained. An electronic musical instrument according to this second embodiment is configured as shown in FIG. 1, but in this second embodiment, a sequence reproduction program shown in FIG. 11 instead of the sequence reproduction program shown in FIG. 2, a fade-out program shown in FIG. 12 instead of the fade-out program shown in FIG. 3 and a fade-in program shown in FIG. 13 instead of the fade-in program shown in FIGS. 4 and 5 are stored in the external storage device 25 and executed by the CPU 21.

The channel priority data is omitted from the music piece data, so that it is composed only of the tempo/time data and performance data. In this performance data, the channel number indicated by the channel information is limited to any one of 1 to 8. The number of the tone generating channels in the tone generating circuit 14 is 16 like the first embodiment. The performance data including the MIDI channel numbers less than the number of the tone generating channels is, for example, prepared by a maker of this performance data. The CPU 21 may automatically analyze the performance data by the execution of an unillustrated program, and may delete the performance data relating to a certain channel based upon the analyzing result. Further, a user may delete the performance data relating to a certain channel in accordance with the instruction of a computer program when he/she selects a music piece or when he/she instructs the order of priority.

Figure 14:
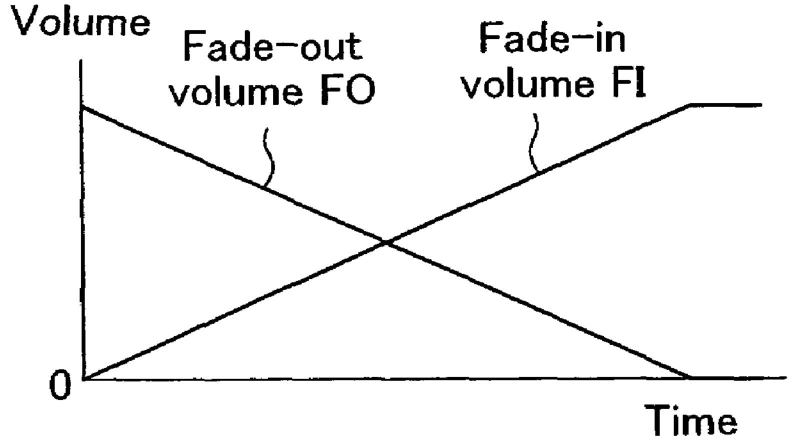
FIG. 14 is a characteristic view showing a time change in a fade-out volume and fade-in volume according to the second embodiment of the present invention.

The second embodiment has only one type of the fade-out volume table and fade-in volume table. The fade-out volume control data FO stored in the fade-out volume table has a characteristic of gradually decreasing with the lapse of time as shown in FIG. 14. The fade-in volume control data FI stored in the fade-in volume table has a characteristic of gradually increasing with the lapse of time as shown in FIG. 14. The other configurations are the same as that of the first embodiment. The configurations and program process same as those in the first embodiment are given same numerals.

The operation of the second embodiment having the aforesaid configuration will be explained. In this second embodiment too, the CPU 21 repeatedly executes the sequence reproduction program in FIG. 11, the fade-out program in FIG. 12 and fade-in program in FIG. 13, for every predetermined short period. In this sequence reproduction program in FIG. 11 too, the sequence music piece data pieces SSG(1), SSG(2), . . . SSG(M) are generated by the processes at Steps S10 and S11, like the first embodiment. Then, the operation flag RUN is set to "1" and the head music piece data SSG(1) is written into the RAM 24 as the first music piece data by the processes at Steps S12 to S16, and thereafter, a first channel changeover flag CNG1 is initialized to "0" by the process at Step S100. This first channel changeover flag CNG1 indicates that the generation of the tone signal based upon the performance data in the first music piece data is assigned to the tone generating channels 1 to 8 in the tone generating circuit 14 when the value thereof is "0", while it indicates that the generation of the same tone signal is assigned to the tone generating channels 9 to 16 in the tone generating circuit 14 when the value thereof is "1".

After the MIDI message of the first music piece data is read out in accordance with the tempo of the first music piece data by the process at Step S20, it is determined at Step S101 whether the first channel changeover flag CNG1 is "1" or not. If the flag CNG1 is "1", "8" is added at Step S102 to the MIDI channel number in the read-out MIDI message by the process at Step S20 to change the MIDI channel number, and then, the program proceeds to Step S103. This means that the generation of the tone signal based upon the performance data in the first music piece data is assigned to any one of the tone generating channels 9 to 16 in the tone generating circuit 14. On the other hand, if the first channel changeover flag CNG1 is "0", the program directly proceeds to Step S103 without executing the process at Step S102. This means that the generation of the tone signal based upon the performance data in the first music piece data is assigned to any one of the tone generating channels 1 to 8 in the tone generating circuit 14.

At Step S103, the MIDI message including the changed MIDI channel number or the MIDI message in which the MIDI channel number is unchanged is outputted to the tone generating circuit 14. The tone generating circuit 14 supplies the event information in the MIDI message to the tone generating channel corresponding to the supplied MIDI channel number, thereby controlling the generation environment of the tone signal and the generation of the tone signal at the tone generating channel in accordance with the event information, like the first embodiment. Accordingly, the first music piece data is reproduced at the tone generating circuit 14, like the first embodiment. As for the head music piece data SSG(1) of the sequence music piece data pieces SSG(1), SSG(2), . . . SSG(M), the generation of the tone signal is controlled at the tone generating channels 1 to 8, since the first channel changeover flag CNG1 is set to "0" by the initialization at Step S100.

After it is determined that the instruction for the changeover of the music piece is given at Step S22, the operation of the fade-out/fade-in counter is started and controlled by the process at Step S104. The count value of the fade-out/fade-in counter simultaneously shows the lapse of time at the fade-out control and fade-in control. This is because the fade-out and fade-in are controlled synchronously at all tone generating channels in this second embodiment.

After the second music piece data is written in the RAM 24 by the process at Step S29, a second channel changeover flag CNG2 is set to "1" by the processes at Steps S105 to S107, if the first channel changeover flag CNG1 is "0". If the first channel changeover flag CNG1 is "1", the second channel changeover flag CNG2 is set to "0". This second channel changeover flag CNG2 indicates that the generation of the tone signal based upon the performance data in the second music piece data is assigned to the tone generating channels 1 to 8 in the tone generating circuit 14 when the value thereof is "0", while it indicates that the generation of the same tone signal is assigned to the tone generating channels 9 to 16 in the tone generating circuit 14 when the value thereof is "1". Accordingly, the control by the processes at Steps S105 to S107 is that the second music piece data is reproduced at the tone generating channels 9 to 16 (1 to 8) that are not utilized in the first music piece data, in case where the first music piece data is reproduced at the tone generating channels 1 to 8 (or 9 to 16). The other processes in the sequence reproduction program are the same as those in the first embodiment.

Subsequently, the fade-out program in FIG. 12 will be explained. When the changeover of a music piece is instructed and the cross-fade flag CRF is set to "1", the CPU 21 starts to execute the processes at Step S110 and the following Steps. At Step S10, the fade-out volume table (FIG. 14) is referred to, so that the volume control data FO at the time designated by the fade-out/fade-in counter is calculated. A predetermined volume value VOL determined beforehand is multiplied by this volume control data, thereby calculating the volume control data VOL·FO. In this case too, a value optionally designated by a user or a value instructed by the volume adjusting operation element in the setting operation element group 12 may be applied as this predetermined volume value VOL.

After the process at Step S110, the calculated volume control data VOL·FO is outputted to the tone generating channels 1 to 8 in the tone generating circuit 14 by the processes at Steps S11 to S113, if the first channel changeover flag CNG1 is "0". If the first channel changeover flag CNG1 is "1", the calculated volume control data VOL·FO is outputted to the tone generating channels 9 to 16 in the tone generating circuit 14. Thus, the volume of each reproduced tone signal based upon the performance data in the first music piece is uniformly controlled by the volume control data VOL·FO.

Subsequently, the MIDI message in the first music piece data in the RAM 24 is sequentially read out according to a tempo in the first music piece data at Step S45. Then, it is determined at Step S47 whether the read-out MIDI message is a channel volume or not. If the read-out MIDI message is a channel volume, the volume control data FO calculated by the process at Step S110 is multiplied by the volume parameter VOL of the channel volume, thereby correcting the volume parameter VOL at Step S114. As for the channel whose channel volume is read out as the MIDI message after the changeover instruction of a music piece is given, this volume parameter VOL is used instead of the predetermined volume value VOL at the processes at Step S110 and the following Steps.

Figure 11:
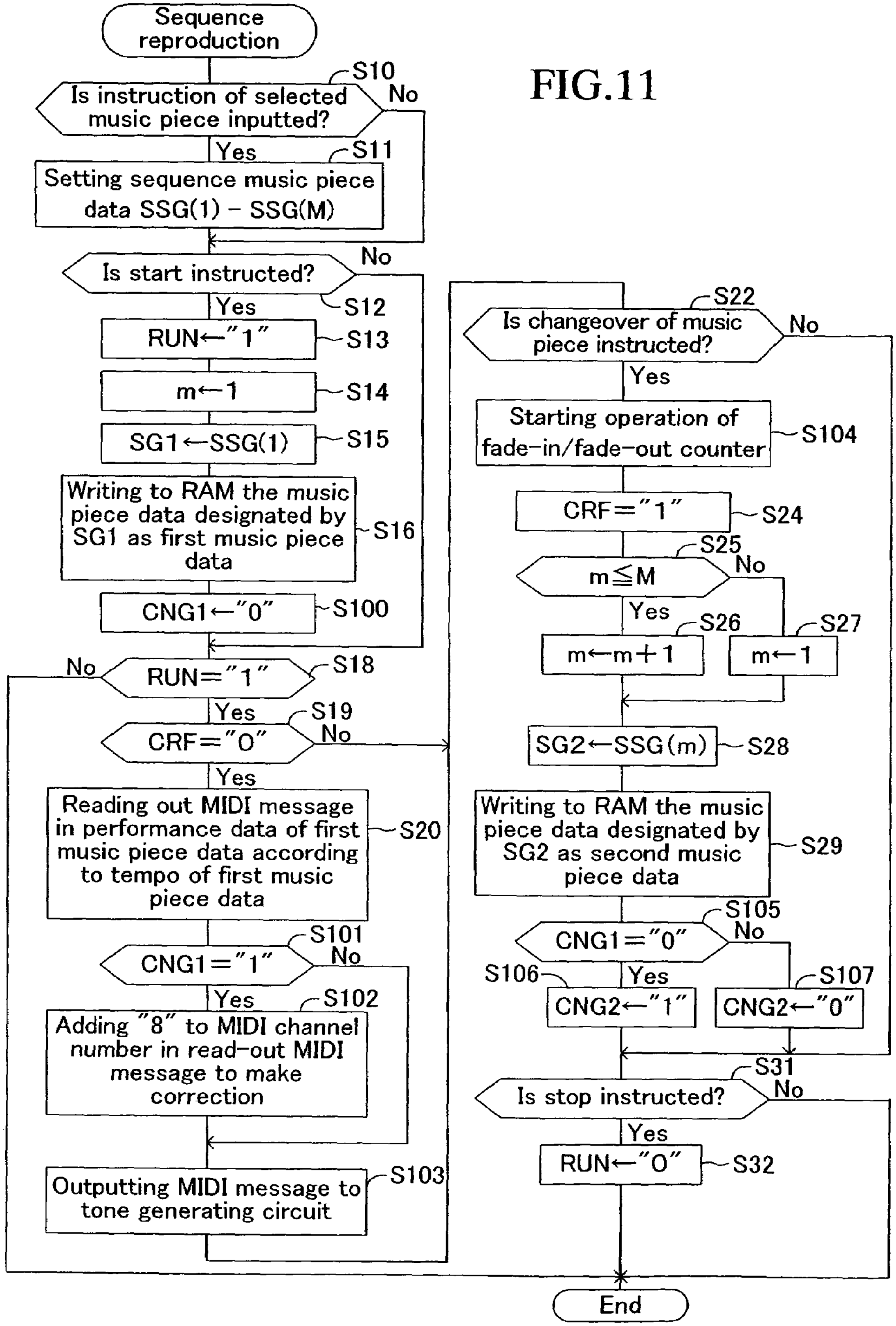
FIG. 11 is a flowchart showing a sequence reproduction program executed in the electronic musical instrument according to the second embodiment.

Then, if the first channel changeover flag CNG1 is "0", the event information in the read-out MIDI message is reproduced at the tone generating channels 1 to 8 in the tone generating circuit 14 by the processes at Steps S115 to S117, like the processes at Steps S101 to S103 in FIG. 11. Further, if the first channel changeover flag CNG1 is "1", the event information in the read-out MIDI message is reproduced at the tone generating channels 9 to 16 in the tone generating circuit 14. In case where the MIDI message is a channel volume, the event information in the MIDI message corrected by the process at Step S114 is outputted to the tone generating channels 1 to 8 or 9 to 16 in the tone generating circuit 14, and used for the reproduction. It should be noted that, in this case, the volume control data VOL·FO that gradually decreases with the lapse of time is supplied, by the processes at Steps S110 to S113, S47 and S114, to the tone generating channels 1 to 8 (or 9 to 16) in the tone generating circuit 14 where the first music piece data is reproduced. Accordingly, after the changeover of a music piece is instructed, the volume of the tone signal relating to the first music piece data generated from each tone generating channel in the tone generating circuit 14 is gradually decreased by the repeated execution of the fade-out program.

Figure 13:
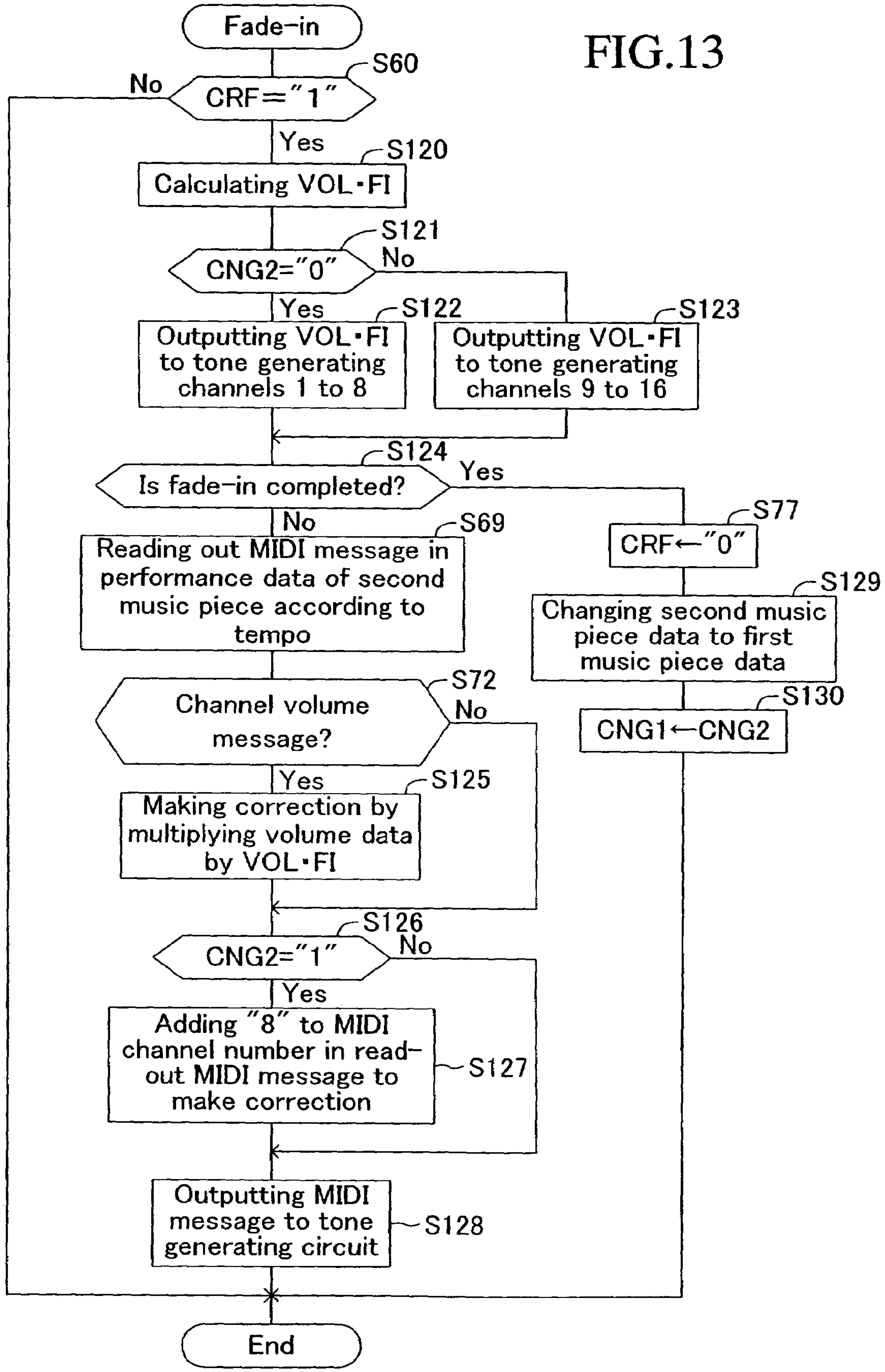
FIG. 13 is a flowchart showing a fade-in program executed in the electronic musical instrument according to the second embodiment.

Subsequently, the fade-in program in FIG. 13 will be explained. When the changeover of a music piece is instructed and the cross-fade flag CRF is set to "1", the CPU 21 starts to execute the processes at Step S120 and the following Steps. At Step S120, the fade-in volume table (FIG. 14) is referred to, so that the volume control data FI at the time designated by the fade-out/fade-in counter is calculated. A predetermined volume value VOL determined beforehand is multiplied by this volume control data, thereby calculating the volume control data VOL FI. In this case too, a value optionally designated by a user or a value instructed by the volume adjusting operation element in the setting operation element group 12 may be applied as this predetermined volume value VOL.

After the process at Step S120, the calculated volume control data VOL·FI is outputted to the tone generating channels 1 to 8 in the tone generating circuit 14 by the processes at Steps S121 to S123, if the second channel changeover flag CNG2 is "0". If the second channel changeover flag CNG2 is "1", the calculated volume control data VOL·FO is outputted to the tone generating channels 9 to 16 in the tone generating circuit 14. Thus, the volume of each reproduced tone signal based upon the performance data in the second music piece is uniformly controlled by the volume control data VOL·FI.

Then, it is determined at Step S124 whether the fade-in of the tone signal by the second music piece data has been completed or not. It is determined in this determination whether the count value of the fade-out/fade-in counter shows a value greater than an increase ending timing of the fade-in volume control data in FIG. 14. If the fade-in of the tone signal by the second music piece has not yet been completed, "NO" determination is made at Step S124, and then, the MIDI message in the second music piece data in the RAM 24 is sequentially read out according to a tempo of the second music piece data at Step S69. Then, it is determined at Step S72 whether the read-out MIDI message is a channel volume or not. If the read-out MIDI message is a channel volume, the volume control data FI calculated by the process at Step S120 is multiplied by the volume parameter VOL of the channel volume, thereby correcting the volume parameter VOL at Step S125. As for the channel whose channel volume is read out as the MIDI message after the changeover instruction of a music piece is given, this volume parameter VOL is used instead of the predetermined volume value VOL at the processes at Step S120 and the following Steps.

Figure 12:
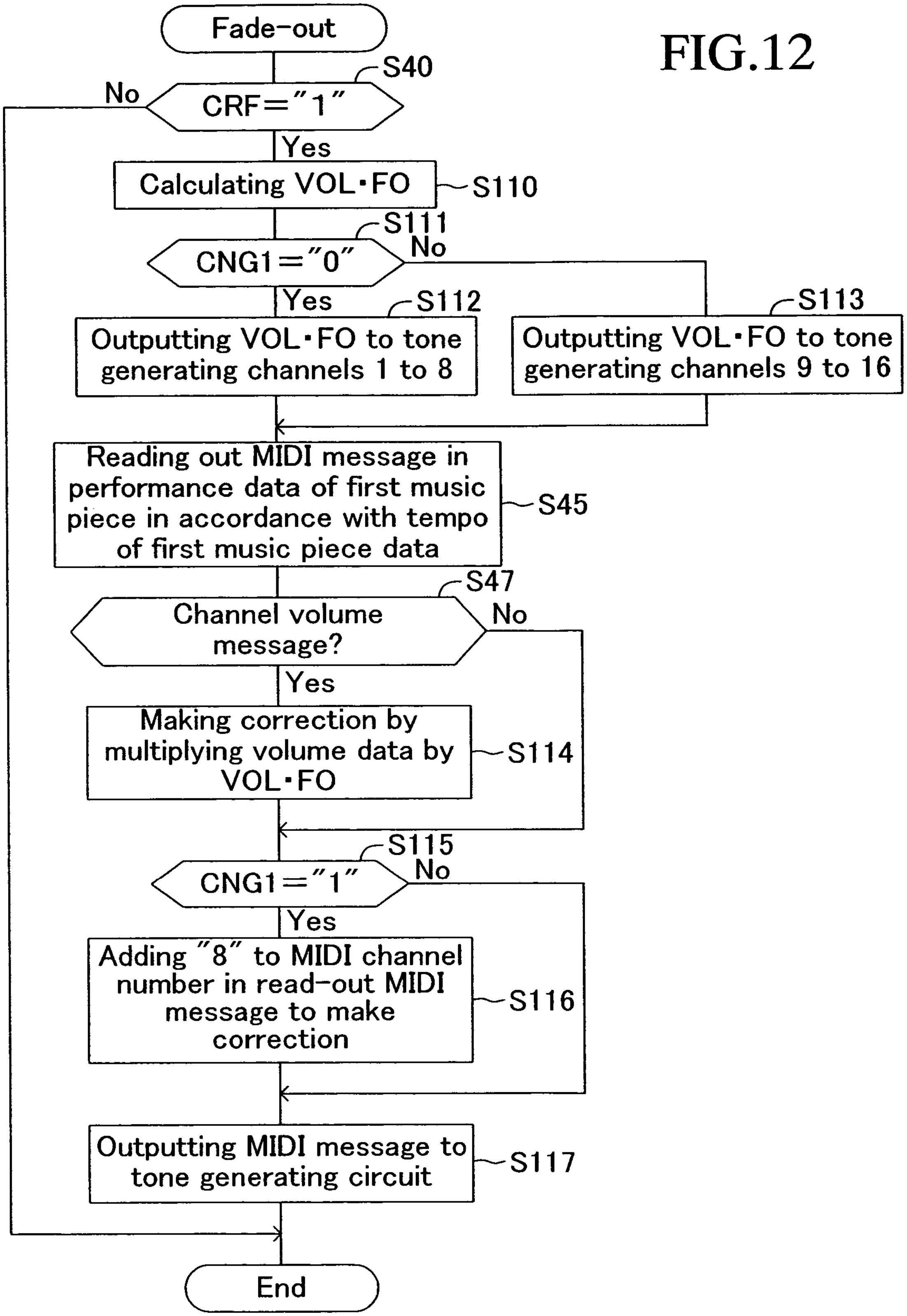
FIG. 12 is a flowchart showing a fade-out program executed in the electronic musical instrument according to the second embodiment.

Then, the processes at Steps S126 to S128 wherein the first channel changeover flag CNG1 at the processes at Steps S101 to S103 in FIG. 11 and at Steps S115 to S117 in FIG. 12 are replaced with the second channel changeover flag CNG2 are executed. If the second channel changeover flag CNG2 is "1", the event information in the read-out MIDI message is reproduced at the tone generating channels 9 to 16 in the tone generating circuit 14 by the processes at Steps S126 to S128. Further, if the second channel changeover flag CNG2 is "0", the event information in the read-out MIDI message is reproduced at the tone generating channels 1 to 8 in the tone generating circuit 14. In case where the MIDI message is a channel volume, the event information in the MIDI message corrected by the process at Step S125 is outputted to the tone generating channels 1 to 8 or 9 to 16 in the tone generating circuit 14, and used for the reproduction. It should be noted that, in this case, the volume control data VOL·FI that gradually increases with the lapse of time is supplied, by the processes at Steps S120 to S123, S72 and S125, to the tone generating channels 9 to 16 (or 1 to 8) in the tone generating circuit 14 where the second music piece data is reproduced. Accordingly, after the changeover of a music piece is instructed, the volume of the tone signal relating to the second music piece data generated from each tone generating channel in the tone generating circuit 14 is gradually increased by the repeated execution of the fade-in program.

When the fade-in of the tone signal by the second music piece data has been completed by the repeated execution of this fade-in program, "YES" determination is made at Step S124, and then, the processes at Steps S77, S129 and S130 are executed. At Step S77, the cross-fade flag CRF is set to "0". At Step S129, the second music piece data in the RAM 24 is changed to the first music piece data. At Step S130, the first channel changeover flag CNG1 is changed to a value indicated by the second channel changeover flag CNG2, and then, the execution of this fade-in program is ended.

After the fade-in has been completed, the music piece data that is the second music piece data during the cross-fade is reproduced as the first music piece data by the execution of the sequence reproduction program. In this case, the first channel changeover flag CNG1 is changed to a value indicated by the second channel changeover flag CNG2, whereby new first music piece data is reproduced at the tone generating channel same as that during the cross-fade.

Figure 15:
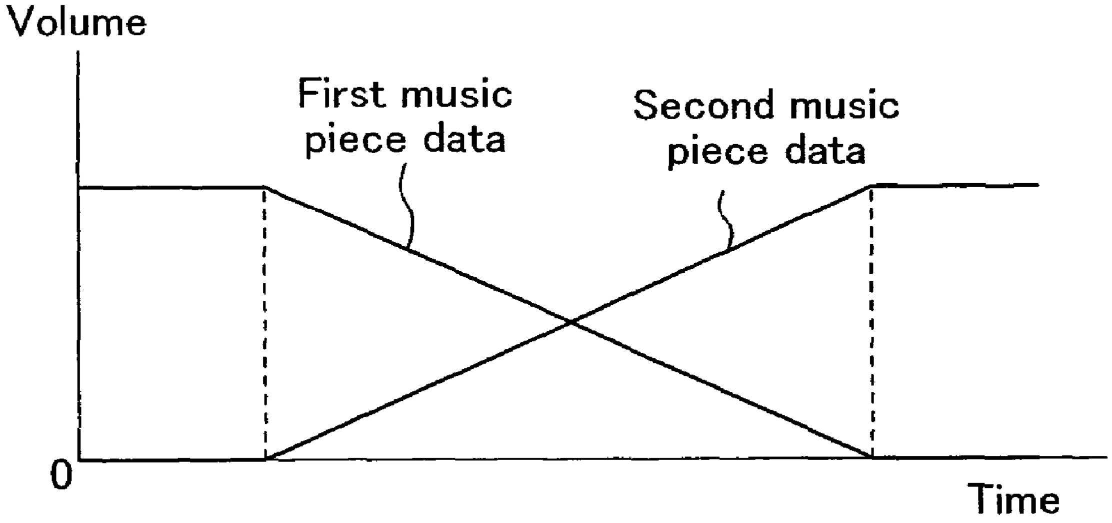
FIG. 15 is an operation explaining view for explaining an operation of the second embodiment and a characteristic view of fade-in volume control data.

As can be understood from the explanation about the operation, according to the second embodiment, the tone generating channel utilized for the reproduction of the first and second music piece data pieces is alternately changed over, whereby the tone generating channel that is not utilized for the assignment of the performance data in the first music piece data is used as the tone generating channel to which the performance data of the second music piece data is assigned. Upon the changeover of these music pieces, a cross-fade process is realized by the execution of the fade-out program and fade-in program, in which the reproduced tone signal by the performance data in the first music piece data is gradually decreased uniformly and the reproduced tone signal by the performance data in the second music piece data is gradually increased uniformly (see FIG. 15). Accordingly, only by using a single tone generating circuit 14, the continuous reproduction of a music piece can be naturally performed as cross-faded in this second embodiment.

OTHER MODIFIED EXAMPLES

The present invention is not limited to the aforesaid first and second embodiments, but various modifications are possible without departing from the spirit of the present invention.

For example, although the tone generating channel number in the tone generating circuit 14 is set to 16 in the first and second embodiments, the number of the tone generating channel can be appropriately changed so long as it is plural. Further, in the first and second embodiments, the volume control data pieces FO and FI for realizing the fade-out and fade-in are stored in the external storage device 25 in the form of a table. However, instead of this, functions indicating a time change of the volume control data pieces FO and FI are stored in the external storage device 25 respectively, and the volume control data pieces FO and FI that gradually change with a lapse of time for controlling the volume of the reproduced tone signal may be calculated by using these functions.

In the first and second embodiments, plural music pieces are automatically reproduced one after another for every predetermined period. However, instead of this, a reproduction of a next music piece may be started after the reproduction of a whole music piece is completed. In this case, a timing before the end of the music piece by a predetermined period is detected, and the fade-out and fade-in of the music piece may be started from this timing.

In the first and second embodiments, the present invention is applied to an electronic musical instrument using a key as a performance operation element. However, instead of the key, the present invention may be applied to an electronic musical instrument using a press switch or touch switch as a performance operation element for designating a pitch. Further, the present invention is applicable to other electronic musical instrument capable of reproducing music piece data, such as karaoke apparatus, automatic performance apparatus, music amusement apparatus, personal computer, or the like.

What is claimed is:

1. An automatic performance apparatus that supplies performance data indicating a music piece to a tone generating circuit having plural tone generating channels each generating a tone signal, to thereby reproduce the music piece, comprising:

a performance data memory that stores plural pieces of performance data corresponding to each of the plural music pieces and including channel information for designating any one of the plural tone generating channels;

a performance data read-out portion that reads out the performance data of the first and the second music piece among plural pieces of performance data of the music piece stored in the performance data memory with the progression of the music piece;

a fade-out processing portion that processes the read-out performance data of the first music piece such that the tone signal generated by the performance data is faded out and outputs the resultant to the tone generating circuit;

a fade-in processing portion that processes the read-out performance data of the second music piece such that the tone signal generated by the performance data is faded in and outputs the resultant to the tone generating circuit; and an assignment controller that assigns the generation of the tone signal based upon the performance data of the second music piece to a tone generating channel that is not used for generating the tone signal based upon the performance data of the first music piece, the assigned tone generating channel being different from a tone generating channel designated by the channel information included in the performance data of the second music piece, wherein the fade-out processing portion processes the performance data such that the fade-out speed of the tone signal is made different for every tone generating channel in accordance with a predetermined order of priority.

2. An automatic performance apparatus according to claim 1, wherein the assignment controller assigns, in accordance with the predetermined priority order specified by the channel information included in the second performance data, the generation of the tone signal based upon the performance data of the second music piece one after another from the tone generating channel in which the fade-out of the tone signal generated by the performance data of the first music piece is ended earlier.

3. An automatic performance apparatus according to claim 2, wherein the predetermined order of priority relating to the first and second music pieces is determined by priority data indicating the priority of plural tone generating channels indicated by the channel information for every music piece.

4. An automatic performance apparatus according to claim 1, further comprising:

a temporal storage portion that, when the performance data of the second music piece is read out for setting the generation environment of the tone signal with the state where the generation of the tone signal based upon the read-out performance data of the second music piece cannot be assigned to any one of tone generating channels of the tone generating circuit, temporarily stores the performance data for setting the generation environment of the tone signal; and a stored performance data output portion that outputs the temporarily stored performance data for setting the generation environment of the tone signal to the tone generating circuit, when a condition is established in which the generation of the tone signal based upon the read-out performance data of the second music piece can be assigned to any one of the tone generating channels of the tone generating circuit.

5. An automatic performance apparatus according to claim 4, wherein the generation environment of the tone signal is at least one of a musical tone element of a generated tone, an effect given to the generated tone and sound mode of the generated tone.

6. An automatic performance apparatus according to claim 1, wherein the assignment controller changes the channel information included in the performance message among the performance data of the second music piece such that the generation of the tone signal based upon the performance message of a performance channel among the performance data of the second music piece is assigned to the tone generating channel.

7. An automatic performance apparatus according to claim 1, wherein the tone generating channel at which the fade-out is ended is regarded as a tone generating channel at which reproduction for a performance channel included in performance data of the first music piece is completed.

8. A method applied to an automatic performance apparatus having a performance data memory that stores plural pieces of performance data corresponding to each of the plural music pieces and including channel information for designating any one of the plural tone generating channels, said apparatus supplies performance data indicating a music piece to a tone generating circuit having plural tone generating channels each generating a tone signal to thereby reproduce the music piece, said method comprising the steps of:

reading out the performance data of the first and the second music piece among plural pieces of performance data of the music piece stored in the performance data memory with the progression of the music piece;

processing the read-out performance data of the first music piece such that the tone signal generated by the performance data is faded out and outputs the resultant to the tone generating circuit;

processing the read-out performance data of the second music piece such that the tone signal generated by the performance data is faded in and outputs the resultant to the tone generating circuit; and assigning the generation of the tone signal based upon the performance data of the second music piece to a tone generating channel that is not used for generating the tone signal based upon the performance data of the first music piece, the assigned tone generating channel being different from a tone generating channel designated by the channel information included in the performance data of the second music piece, wherein the processing of the read-out performance data of the first music piece processes the performance data such that the fade-out speed of the tone signal is made different for every tone generating channel in accordance with a predetermined order of priority.

9. A computer program embodied in a machine-readable medium, said computer program applied to an automatic performance apparatus having a performance data memory that stores plural pieces of performance data corresponding to each of the plural music pieces and including channel information for designating any one of the plural tone generating channels, said apparatus supplies performance data indicating a music piece to a tone generating circuit having plural tone generating channels each generating a tone signal to thereby reproduce the music piece, said computer program causing the apparatus to perform a method comprising the steps of:

reading out the performance data of the first and the second music piece among plural pieces of performance data of the music piece stored in the performance data memory with the progression of the music piece;

processing the read-out performance data of the first music piece such that the tone signal generated by the performance data is faded out and outputs the resultant to the tone generating circuit;

processing the read-out performance data of the second music piece such that the tone signal generated by the performance data is faded in and outputs the resultant to the tone generating circuit; and assigning the generation of the tone signal based upon the performance data of the second music piece to a tone generating channel that is not used for generating the tone signal based upon the performance data of the first music piece, the assigned tone generating channel being different from a tone generating channel designated by the channel information included in the performance data of the second music piece, wherein the processing of the read-out performance data of the first music piece processes the performance data such that the fade-out speed of the tone signal is made different for every tone generating channel in accordance with a predetermined order of priority.

* * * * *